United States Patent
Kim et al.

(10) Patent No.: US 6,850,369 B2
(45) Date of Patent: Feb. 1, 2005

(54) SPIRAL LENS DISK AND PROJECTION SYSTEM EMPLOYING THE SAME

(75) Inventors: Tae-hee Kim, Suwon-si (KR); Yung-jun Park, Yongin-si (KR); Kun-ho Cho, Suwon-si (KR); Dae-sik Kim, Suwon-si (KR); Hee-joong Lee, Anyang-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/386,923

(22) Filed: Mar. 13, 2003

(65) Prior Publication Data
US 2004/0021944 A1 Feb. 5, 2004

(30) Foreign Application Priority Data
Jul. 11, 2002 (KR) .............................. 10-2002-0040399

(51) Int. Cl.[7] .............................................. G02B 27/10
(52) U.S. Cl. ....................................... 359/626; 359/619
(58) Field of Search ................................. 359/621, 625, 359/619, 626; 40/454

(56) References Cited

U.S. PATENT DOCUMENTS

| | | | | |
|---|---|---|---|---|
| 3,045,237 A | * | 7/1962 | Marston | 343/754 |
| 3,704,068 A | * | 11/1972 | Waly | 355/46 |
| 5,128,783 A | * | 7/1992 | Abileah et al. | 349/162 |
| 5,694,620 A | * | 12/1997 | Wilk et al. | 396/6 |
| 2004/0046946 A1 | * | 3/2004 | Kim | 353/101 |
| 2004/0057018 A1 | * | 3/2004 | Cho et al. | 353/31 |
| 2004/0105267 A1 | * | 6/2004 | Cho et al. | 362/296 |

* cited by examiner

Primary Examiner—Ricky Mack
(74) Attorney, Agent, or Firm—Sughrue Mion, PLLC

(57) ABSTRACT

A spiral lens disk and a projection system adopting the same are provided. The spiral lens disk has spirally arranged cylinder lens cells and scrolls incident light by converting the rotation of the cylinder lens cells into rectilinear motion of a cylinder lens array. The projection system includes at least one spiral lens disk such that color scrolling is achieved using a single component to form a color image. Due to a reduction in the number of components, a light, low-price projection system can be obtained, and a single-panel projection system with high light efficiency can also be obtained.

31 Claims, 21 Drawing Sheets

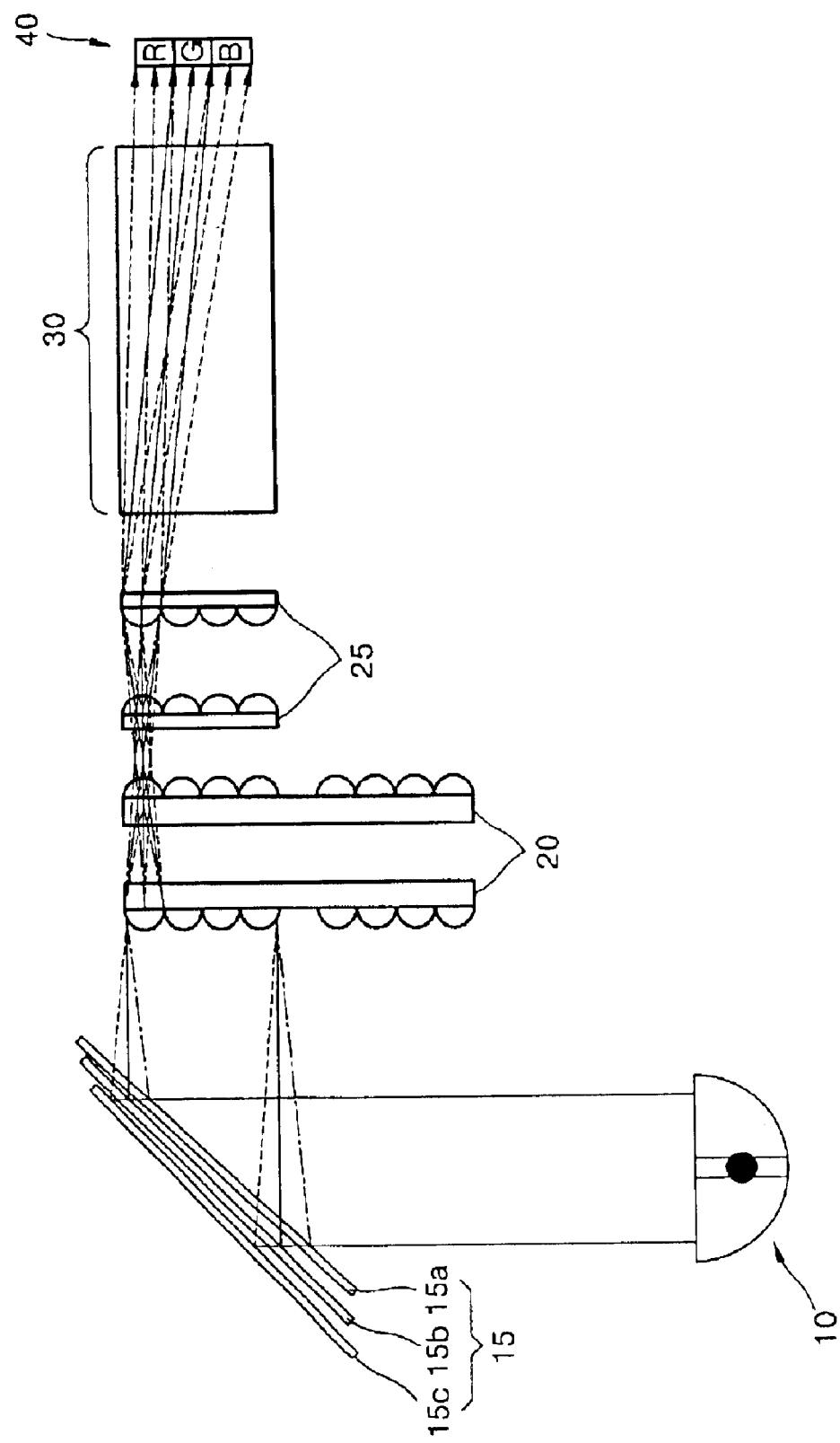

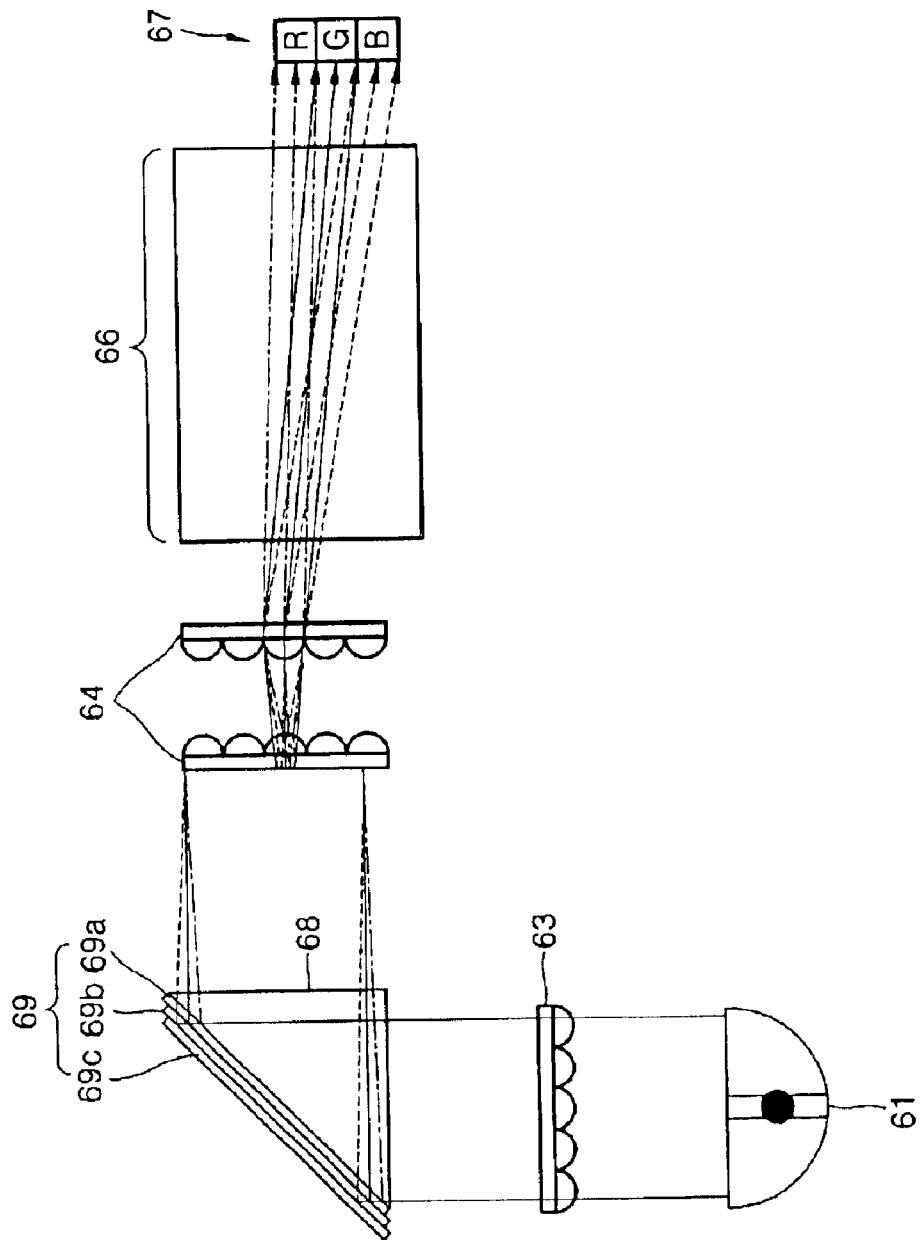

m -ORDER DIFFRAETED BEAM

-FIRST -ORDER BEAM

+FIRST -ORDER BEAM

IMAGE SUFACE

SPIRAL LENS DISK AND PROJECTION SYSTEM EMPLOYING THE SAME

BACKGROUND OF THE INVENTION

This application claims priority from Korean Patent Application No. 2002-40399, filed on Jul. 11, 2002, in the Korean Intellectual Property Office, the disclosure of which is incorporated herein in its entirety by reference.

1. Field of the Invention

The present invention relates to a The present invention relates to a spiral lens disk and a projection system employing the same, and more particularly, to a spiral lens disk that increases the optical efficiency at a low cost in a single-panel structure and a projection system employing the spiral lens disk and scrolling in an improved way so that the projection system becomes compact.

2. Description of the Related Art

Projection systems are classified into 3-panel projection systems and single-panel projection systems according to the number of light valves for controlling the on/off operation of light emitted from a high-output lamp on a pixel-by-pixel basis and forming a picture. Single-panel projection systems can have a smaller optical system than three-panel projection systems but provide an optical efficiency of ⅓ less than that of three-panel projection systems because R, G, and B colors into which white light is separated are used in a sequential method. Hence, attempts to increase the optical efficiency of single-panel projection systems have been made.

In a general single-panel projection system, light radiated from a white light source is separated into R, G, and B colors using a color filter, and the three colors are sequentially sent to a light valve. The light valve appropriately operates according to the sequence of colors received and creates images. As described above, a single-panel optical system sequentially uses colors, so the light efficiency is reduced to ⅓ of the light efficiency of a three-panel optical system. A scrolling method has been proposed to solve this problem. In a color scrolling method, white light is separated into R, G, and B colors, and the three colors are sent to different locations on a light valve. Since an image cannot be produced until all of R, G, and B colors for each pixel reach the light valve, color bars are moved at a constant speed in a particular method.

In a conventional single-panel scrolling projection system, as shown in FIG. 1, white light emitted from a light source 100 passes through first and second lens arrays 102 and 104 and a polarized beam splitter array 105 and is separated into R, G, and B beams by first through fourth dichroic filters 109, 112, 122, and 139. To be more specific, the red beam R and the green beam G, for example, are transmitted by the first dichroic filter 109 and advance along a first light path 11, while the blue beam B is reflected by the first dichroic filter 109 and travels along a second light path 12. The red beam R and the green beam G on the first light path 11 are separated by the second dichroic filter 112. The second dichroic filter 112 transmits the red beam R along the first light path 11 and reflects the green beam G along a third light path 13.

As described above, the light emitted from the light source 100 is separated into the red beam R, the green beam G, and the blue beam B, and they are scrolled while passing through corresponding first through third prisms 114, 135, and 142. The first through third prisms 114, 135 and 142 are disposed on the first through third light paths 11, 12, and 13, respectively, and rotate at a uniform speed such that R, G, and B color bars are scrolled. The green beam G and the blue beam B that travel along the second and third light paths 12 and 13, respectively, are transmitted and reflected by the third dichroic filter 139, respectively, and then combined. Finally, the R, G, and B beams are combined by the fourth dichroic filter 122. The combined beam is transmitted by a polarized beam splitter 127 and forms a picture using a light valve 130.

The scrolling of the R, G, and B color bars due to rotation of the first through third prisms 114, 135, and 142 is shown in FIG. 2. Scrolling represents the movement of color bars formed on the surface of the light valve 130 when prisms corresponding to colors are synchronously rotated.

The light valve 130 processes picture information depending on an on-off signal for each pixel and forms a picture. The formed picture is magnified by a projecting lens (not shown) and lands on a screen.

Since such a method is performed using a light path provided for each color, a light path correction lens must be provided for each color, and a component part for re-collecting separated light beams must be provided for each color. Accordingly, an optical system is large, and yield is degraded due to a complicate manufacturing and assembling process. In addition, a large amount of noise is generated due to the driving of three motors for rotating the first through third prisms 114, 135, and 142, and the manufacturing costs of a conventional projection system adopting the above-described method is increased compared to a color wheel method adopting only one motor.

In order to produce a color picture using a scrolling technique, color bars as shown in FIG. 2 must be moved at a constant speed. The conventional projection system must synchronize a light valve with three prisms in order to achieve scrolling. However, controlling the synchronization is not easy. Further, because the scrolling prisms 114, 135, and 142 make circular motions, the color scrolling speed by the three scrolling prisms is irregular, consequently deteriorating the quality of an image.

SUMMARY OF THE INVENTION

The present invention provides a spiral lens disk designed so that a single component can perform scrolling.

The present invention also provides a compact single-panel projection system employing the spiral lens disk to improve the light efficiency.

According to an aspect of the present invention, there is provided a spiral lens disk in which cylinder lens cells are spirally arranged so that the rotation of a cylinder lens cell converts into the rectilinear motion of a cylinder lens array.

The cylinder lens cells can be formed of either a diffractive optical element or a hologram optical element.

Preferably, the cylinder lens cells are arranged so that, when a normal line is drawn to the cylinder lens cells, the interval between adjacent lens cells is uniform, and the normal vectors of adjacent lens cells are the same.

A spiral track $(Q_{kx}, Q_{ky})$ of a cylinder lens cell satisfies the following Equation:

$$Q_{kx} = Q_{1,x} \cos(k-1)\theta_2 - Q_{1,y} \sin(k-1)\theta_2$$

$$Q_{ky} = Q_{1,y} \sin(k-1)\theta_2 - Q_{1,y} \cos(k-1)\theta_2$$

wherein $Q_1,x$ and $Q_{1,y}$ denote the x and y coordinates of the first cylinder lens cell, respectively, k denotes a natural number, and $\theta_2$ denotes a rotation angle between adjacent curves.

Each of the cylinder lens cells can be formed of any of a binary lens, a continuous relief lens, a multi-step lens, a multi-order refractive lens, a thin hologram lens, and a volume hologram lens.

According to another aspect of the present invention, there is provided a projection system including a light source, an optical separator, at least one spiral lens disk, and a light valve. The optical separator separates light emitted from the light source according to wavelength. The spiral lens disk has spirally arranged cylinder lens cells and converts the rotation of the cylinder lens cells into the rectilinear motion of a cylinder lens array. The light valve receives color beams into which the light emitted from the light source is separated by the optical separator and the spiral lens disk and selectively turns on or off individual pixels according to an input image signal in order to form a color image.

The projection system further includes a fly eye lens array between the spiral lens disk and the light valve. A lens group for making incident light be focused on the light valve is provided along a light path between the fly eye lens array and the light valve.

The optical separator includes first through third dichroic filters adjacently disposed at different angles to selectively transmit or reflect the incident light according to wavelength.

Alternatively, the optical separator can include first through third dichroic filters disposed in parallel to selectively transmit or reflect the incident light according to wavelength.

A first cylinder lens is installed before the at least one spiral lens disk, and a second cylinder lens paired with the first cylinder lens is installed behind the at least one spiral lens disk, in order to control the width of an incident beam.

The number of lens cells on the at least one spiral lens disk can be determined so that the at least one spiral lens disk can operate in synchronization with the operating frequency of the light valve. The rotation frequency of the at least one spiral lens disk can be controlled so as to be synchronized with the operating frequency of the light valve.

According to another aspect of the present invention, there is provided a projection system including a light source, at least one spiral lens disk, and a light valve. The spiral lens disk has spirally arranged cylinder lens cells and is manufactured of either a diffractive optical element or a hologram optical element so that light emitted from the light source is divided according to wavelength and the rotation of the cylinder lens cells is converted into a rectilinear motion of a cylinder lens array. The light valve receives color beams into which the light emitted from the light source is separated by the optical separator and the spiral lens disk and selectively turns on or off individual pixels according to an input image signal in order to form a color image.

BRIEF DESCRIPTION OF THE DRAWINGS

The above and other features and advantages of the present invention will become more apparent by describing in detail exemplary embodiments thereof with reference to the attached drawings in which:

FIG. 3 is a schematic diagram of an example of a projection system according to a first embodiment of the present invention;

FIG. 11 is a schematic view of a projection system according to a fourth embodiment of the present invention;

DETAILED DESCRIPTION OF THE INVENTION

Figure 1:
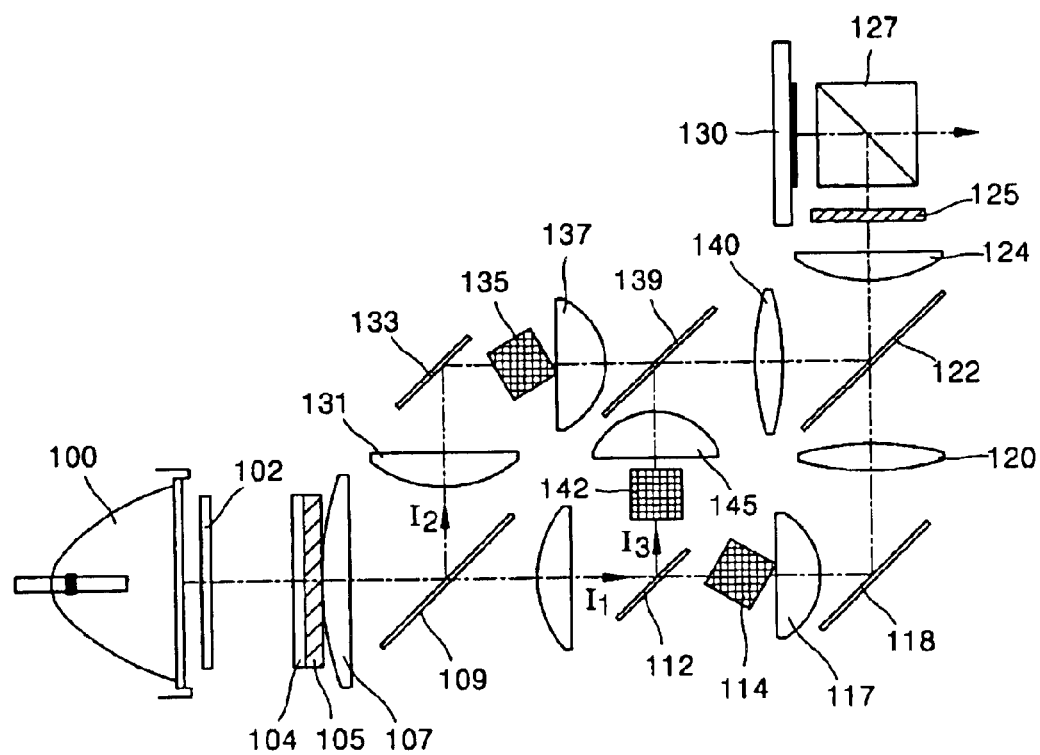
FIG. 1 shows a conventional projection system.
Figure 2:
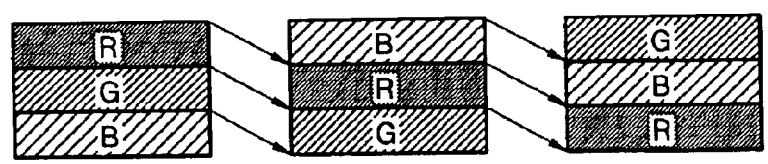
FIG. 2 shows R, G, and B color bars to explain the color scrolling operation of a projection system.

Referring to FIG. 3, a projection system according to a first embodiment of the present invention includes a light source 10, an optical separator 15, at least one spiral lens disk 20, and a light valve 40. The optical separator 15 separates light emitted from the light source 10 according to wavelength. The spiral lens disk 20 scrolls R, G, and B beams, into which light has been separated by the optical separator 15. The light valve 40 processes the scrolled beams according to an image signal and forms a picture.

A fly-eye lens array 25 and a lens group 30 can be further installed along the light path between the spiral lens disk 20 and the light valve 40. A color picture formed by the light valve 40 is magnified by a projecting lens unit (not shown) and projected onto a screen.

The light emitted from the light source 10 is separated into three beams, namely, R, G, and B beams, by the optical separator 15. For example, the optical separator 15 can be constructed with first, second, and third dichroic filters 15a, 15b, and 15c disposed aslant at different angles with respect to an incidence light axis. The optical separator 15 separates incident light according to a predetermined wavelength range and advances the separated light beams at different angles. For example, the first dichroic filter 15a reflects a beam in the red wavelength range, R, from white incident light and, at the same time, transmits beams in the green and blue wavelength ranges, G and B. The second dichroic filter 15b reflects the G beam from the beams transmitted by the first dichroic filter 15a and, at the same time, transmits the B beam. The third dichroic filter 15c reflects the B beam transmitted by the first and second dichroic filters 15a and 15b.

The R, G, and B beams into which incident light has been separated according to wavelength by the first, second, and third dichroic filters 15a, 15b, and 15c are reflected at different angles. The separated colors are incident upon the spiral lens disk 20 and each scrolled by the spiral lens disk 20.

Figure 4A:
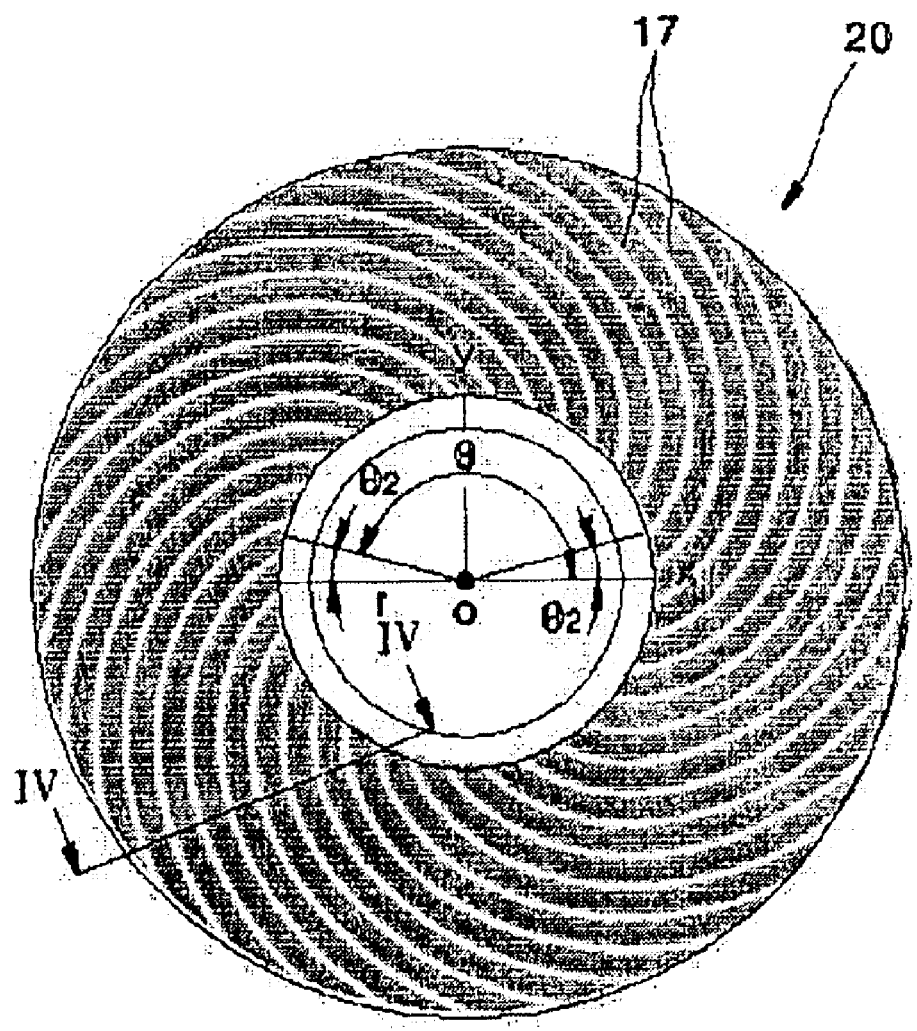
FIG. 4A is a front view of a spiral lens disk according to the present invention.
Figure 4B:
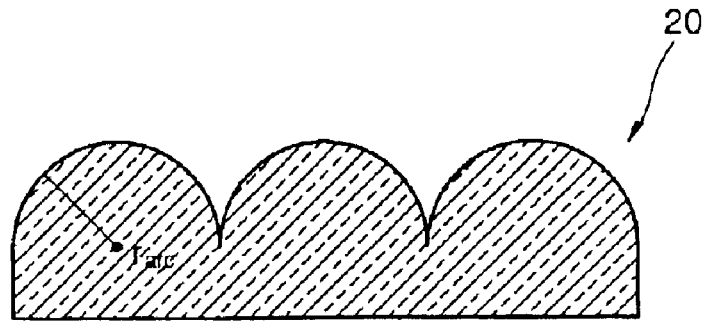
FIG. 4B is a cross-section view taken along line IV—IV of FIG. 4.
Figure 4C:
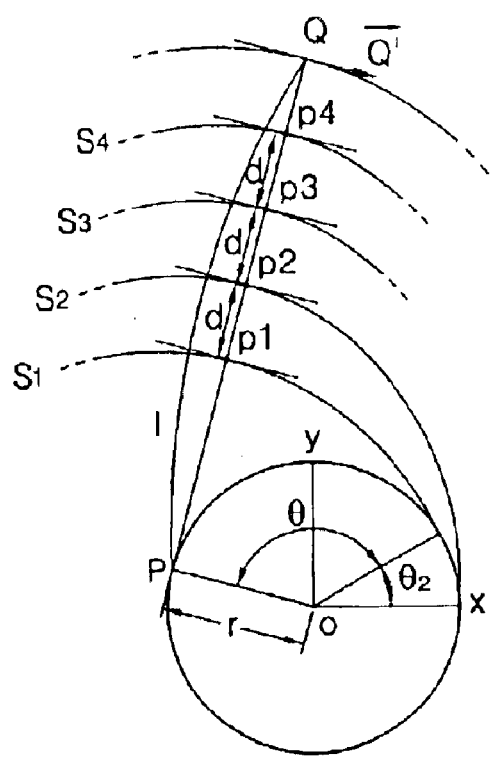
FIG. 4C is a diagram for explaining a design condition for a spiral lens disk according to the present invention.

Referring to FIG. 4A, the spiral lens disk 20 is formed by spirally arranging cylinder lens cells 17. The cross-section of the spiral lens disk 20 has a cylinder lens array structure in which each cylinder lens has a shape of an arc having a radius of curvature $r_{arc}$, as shown in FIG. 4B. The spiral lens disk 20 is designed in a spiral shape using an involute function. The involute function is widely used for gear design and can be considered as a trace along which a thread tip unbound from a spool has passed. To be more specific with reference to FIG. 4C, a tangent line is drawn from a point of contact, P, on a central circle 21 of the spiral lens disk 20 to an arbitrary point Q, and a segment $\overline{PQ}$ is equally divided to create imaginary equal division points p1, p2, p3, and p4. When each of the points is considered as the tip of a thread unbound by a predetermined short length from a spool, Equation 1 can be obtained:

$$l = r*\theta$$

$$\overline{OP} = r(\cos\theta, \sin\theta) \quad (1)$$

wherein r denotes the radius of the central circle 21, 1 denotes the length of the segment $\overline{PQ}$, θ denotes an angle at which a threshold with a length 1 is bound on the central circle 21, and $\overline{OP}$ denotes a vector from the origin O to the point P. Since $\overline{PQ}$ is a vector drawn from the point P to the tangent line, $\overline{PQ}$ is a tangential $$\overline{PQ}l(\sin\theta, -\cos\theta) = r\theta(\sin\theta, -\cos\theta) \quad (2)$$

vector of $\overline{OP}$ and has the length l. Accordingly, $\overline{PQ}$ can be expressed in Equation 2.

Referring to Equations 1 and 2, $\overline{OQ}$ is obtained using Equation 3:

$$\overline{OQ} = \overline{OP} + \overline{PQ} \quad (3)$$

$$= (r\cos\theta + r\theta\sin\theta, r\sin\theta - r\theta\cos\theta)$$

If a tangential vector of $\overline{PQ}$ is $\overline{Q'}$ and the size of $\overline{Q'}$ is l, $\overline{Q'}$ is obtained using Equation 4:

$$\overline{Q'} = l(\cos\theta, \sin\theta) = r\theta(\cos\theta, \sin\theta) \quad (4)$$

The vectors $\overline{PP_1}$, $\overline{PP_2}$, $\overline{PP_3}$, and $\overline{PP_4}$ of the points p1, p2, p3, and p4 have the same point of contact, P, on the central circle 21, the same radius r, and the same angle θ. Accordingly, it can be seen from Equation 4 that the tangential vector $\overline{Q'}$ at each point is the same.

In addition, in adjacent spiral curves ($S_1$ and $S_2$), ($S_2$ and $S_3$) or ($S_3$ and $S_4$), the second spiral curve can be considered having been rotated a predetermined angle $\theta_2$ from the first spiral curve. If it is assumed that a spiral lens disk is divided into n cells, the rotation angle $\theta_2$ between the adjacent curves ($S_1$ and $S_2$), ($S_2$ and $S_3$) or ($S_3$ and $S_4$) can be obtained using Equation 5:

$$\theta_2 = \frac{2\pi}{n} \quad (5)$$

According to Equation 0.1, the size l of $\overline{PQ}$ is proportional to θ, so the distance d between adjacent points p1 and p2, p2 and p3, or p3 and p4 is also proportional to the rotation angle $\theta_2$. Accordingly, the distance between adjacent points p1 and p2, p2 and p3, or p3 and p4 is the same as the shortest distance d between adjacent curves ($S_1$ and $S_2$), ($S_2$ and $S_3$) or ($S_3$ and $S_4$), and the distance d can be obtained $$d = r*\theta_2 = r*\frac{2\pi}{n} \quad (6)$$

using Equation 6:

It can be seen from Equation 6 that the shortest distance d between the adjacent curves ($S_1$ and $S_2$), ($S_2$ and $S_3$) or ($S_3$ and $S_4$) is constant because n and r are constant. A coordinate $Q_k$ of a k-th curve $S_k$ is obtained by rotating the first curve $S_1$ by $(k-1)*\theta_2$. Accordingly, when the coordinate of the first curve $S_1$ is $Q_1$, the coordinate $Q_k$ of the k-th curve $S_k$ can be expressed as in Equation 7:

$$Q_k = Rot((k-1)*Q_2)*Q_1 = Rot\left(\frac{2\pi(k-1)}{n}\right)*Q_1 \quad (7)$$

wherein Rot denotes a rotation unit vector for rotating a point at an arbitrary angle. Equation 7 can be expressed in a determinant, Equation 8:

$$\begin{pmatrix} Q_{k,x} \\ Q_{k,y} \end{pmatrix} = \begin{pmatrix} \cos(k-1)\theta_2 & -\sin(k-1)\theta_2 \\ \sin(k-1)\theta_2 & \cos(k-1)\theta_2 \end{pmatrix} \begin{pmatrix} Q_{1,x} \\ Q_{1,y} \end{pmatrix} \quad (8)$$

Referring to Equation 8, x and y coordinates of the k-th curve can be obtained from Equation 9:

$$Q_{kx} = Q_{1,x}\cos(k-1)\theta_2 - Q_{1,y}\sin(k-1)\theta_2$$

$$Q_{ky} = Q_{1,y}\sin(k-1)\theta_2 - Q_{1,y}\cos(k-1)\theta_2 \quad (9)$$

Curves on a spiral lens disk can be formed along a track obtained by Equation 9, the cross-sectional shape of the spiral lens disk is an arch having the radius of curvature $r_{arc}$, and the size of the spiral lens disk is not specifically limited. The distance d between adjacent curves is calculated using Equation 6, and the entire shape of the spiral lens disk can be designed using the calculated distance d. Additionally, the inner radius of the spiral lens disk must be greater than the inner radius r of a spool, that is, the central circle 21, and the outer diameter thereof is not limited. As described above, the spiral lens disk according to the present invention is designed to have a spiral shape in which, when normal lines are drawn with respect to an arbitrary tangent line on a spool, that is, the central circle 21, at regular intervals, tangential vectors at intersection points p1, p2, p3, and p4 between the tangent line and each of the normal lines satisfy the same condition. Since the distance d is the shortest distance between adjacent cylinder lens cells on the spiral lens disk, and the tangential vectors at the intersection points p1, p2, p3, and p4 are the same, the shapes of the cylinder lens cells have the same curvature.

Figure 5:
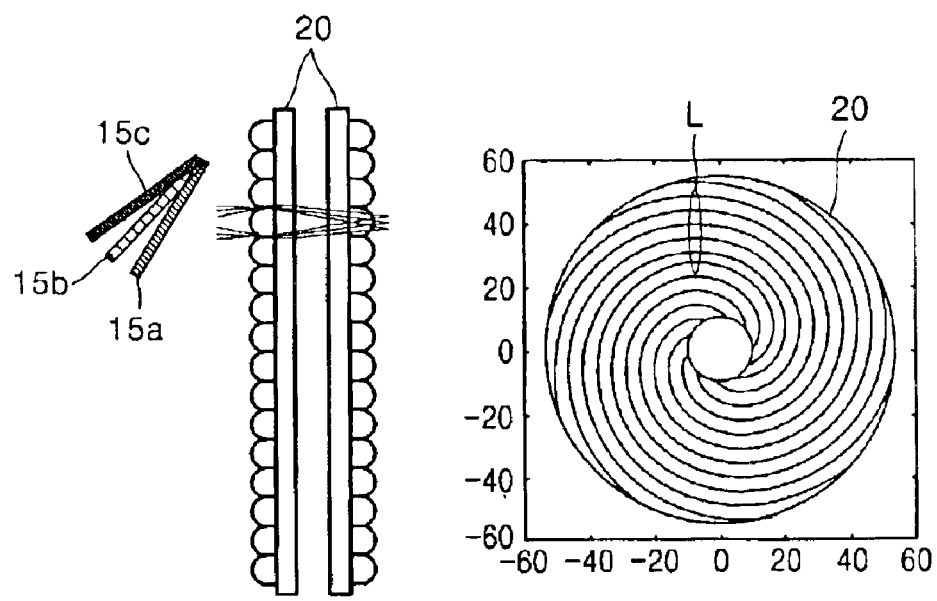
FIG. 5 shows a lateral side and a front side of a spiral lens disk adopted in the projection system according to the first embodiment of the present invention.

In the scrolling operation of the spiral lens disk 20 formed as described above, referring to FIG. 5, light radiated from the light source 10 is divided into light beams with different wavelengths (i.e., R, G, and B beams) by the first, second, and third dichroic mirrors 15a, 15b, and 15c, and the light beams with different wavelengths advance toward the spiral lens disk 20 at different angles. Here, the R, G, and B beams transmitted by the spiral lens disk 20 are indicated by reference character L. The spiral lens disk 20 is composed of a pair of disks, and the R, G, and B beams are focused at different locations on the spiral lens disk 20. From the point of view of the beams L transmitted by the spiral lens disk 20 which rotates at a uniform speed, it appears that the spiral lens disk 20 continuously moves up and down at a uniform speed. Hence, an effect where the positions of the beams transmitted by the spiral lens disk look to be continuously changing can be produced. This process is shown in FIGS. 6A through 6C.

Figure 6A:
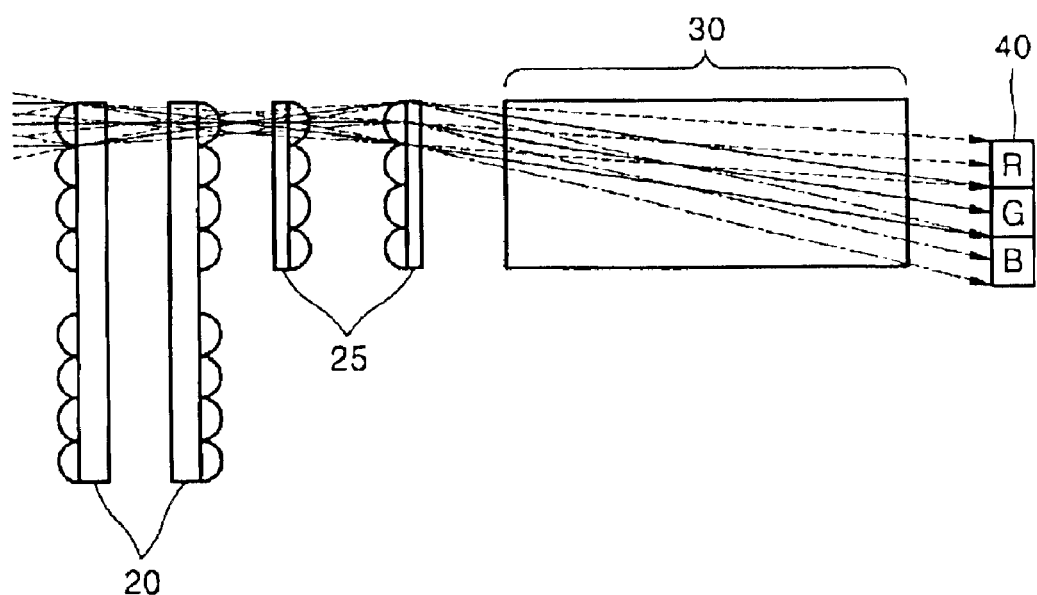
FIGS. 6A through 6C show the scrolling operation of a projection system according to the present invention.
Figure 6B:
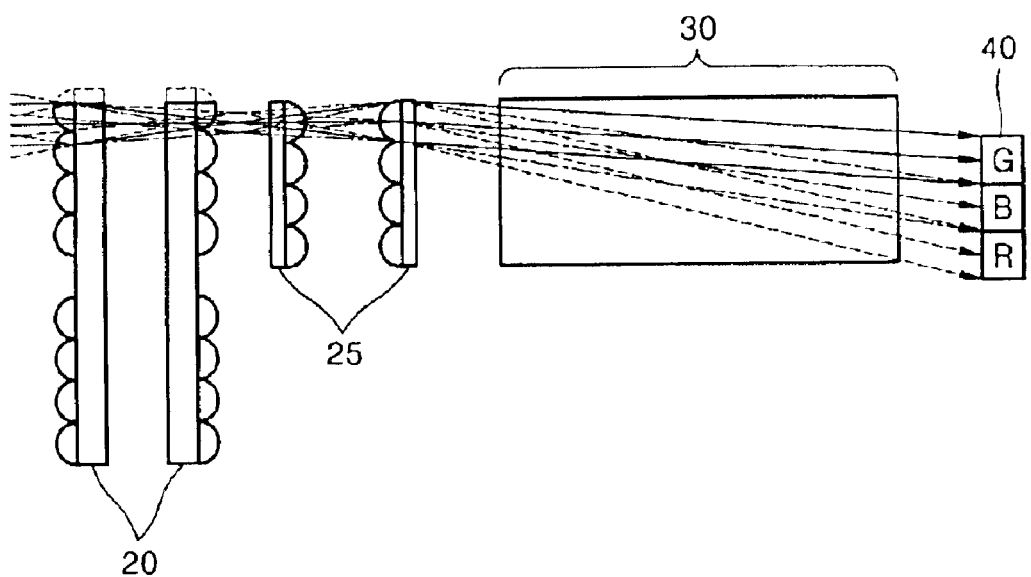
Figure 6C:
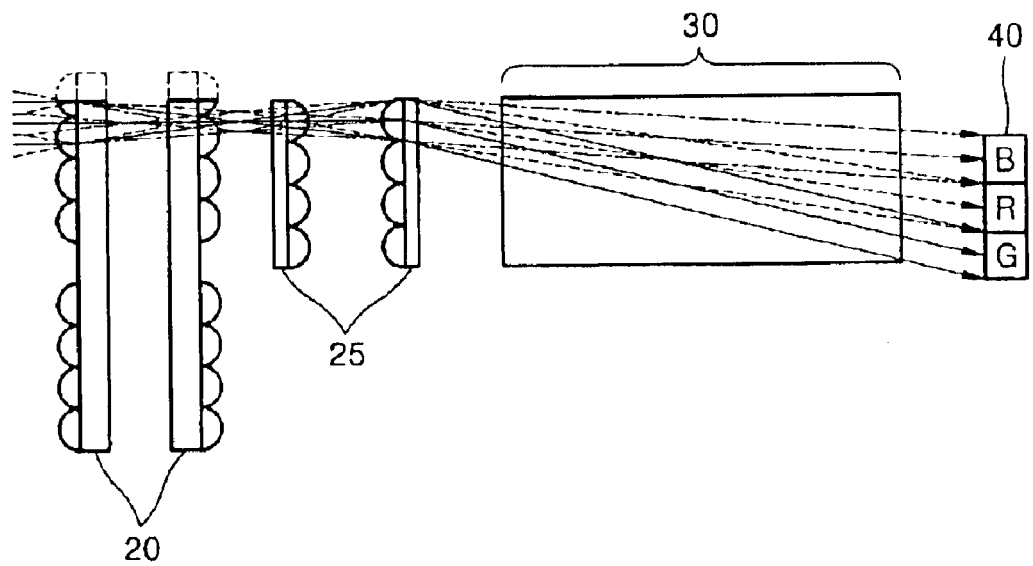

As shown in FIG. 6A, first, light passes through the spiral lens disk 20, the fly eye lens array 25, and the lens group 30 and forms color bars on the light valve 40 in an R, G, and B order. Next, as the spiral lens disk 20 rotates, the lens surface of the spiral lens disk 20 gradually moves upward or downward while the light passes through the spiral lens disk. As the spiral lens disk 20 moves, color bars in a G, B, and R order as shown in FIG. 6B are formed. Then, as the spiral lens disk 20 rotates so as to be scrolled, color bars in a B, R, and G order as shown in FIG. 6C are formed. In other words, the locations of lenses upon which beams are incident change according to the rotation of the spiral lens disk 20, and the rotation of the spiral lens disk 20 is converted into a rectilinear motion of a cylinder lens array at the cross-section of the spiral lens disk 20 so that scrolling is performed. Such scrolling is repeated. As a result, a single-panel projection system can achieve scrolling by using at least one spiral lens disk.

Through this process, the R, G, and B bars are repeatedly scrolled as the spiral lens disk 20 rotates. In particular, since the spiral lens disk 20 continuously rotates in one direction without changing the rotation direction in order to perform scrolling, continuity and consistency can be guaranteed. In addition, scrolling using a single spiral lens disk contributes to keep the speed of color bars constant.

The spiral lens disk 20 converts the rotation of the cylinder lens cells 17 into a rectilinear motion of the cylinder lens array. That is, when the spiral lens disk 20 rotates, it can be seen from the viewpoint of the cross-section of the spiral lens disk 20 that the cylinder lens array moves straight up or down. Since beams with narrow widths pass through the spiral lens disk 20, the effect of beams passing through a cylinder lens array 17 that moves rectilinearly can be obtained.

Thereafter, light transmitted by the spiral lens disk 20 is focused on the individual lens cells of the fly eye lens array 25. Beams of individual colors are overlapped by the lens group 30 and focused on the light valve 40, thereby forming individual color bars.

The number of cylinder lens cells 17 on the spiral lens disk 20 can be controlled to synchronize the spiral lens disk 20 with the operating frequency of the light valves 40. That is, if the operating frequency of the light valve 40 is high, more lens cells are included so that the scrolling speed can be controlled to be faster while keeping the rotation speed of the spiral lens disk constant.

Alternatively, a spiral lens disk can be synchronized with the operating frequency of a light value by maintaining the number of lens cells on the spiral lens disk uniform and increasing the rotation frequency of the spiral lens disk. For example, when the operating frequency of the light valve 40 is 960 Hz, that is, when the light valve 40 operates at $1/960$ of a second per frame such that 960 frames are reproduced per second, a spiral lens disk can be constructed as follows. The outermost diameter of a spiral cylinder lens array is 140 mm, the innermost diameter is 60 mm, the number of spiral lens cells is 32, the width of each spiral lens cell is 5.0 mm, and the radius of curvature of each spiral lens cell is 24.9 mm. In this structure, if the spiral lens disk 20 reproduces 32 frames per one rotation, it must rotate 30 times per second in order to reproduce 960 frames per second. At this speed, the spiral lens disk 20 must rotate 1800 times for 60 seconds, and accordingly it has a rotation speed of 1800 rpm. When the operating frequency of the light value is increased by half and thus the light valve operates at 1440 Hz, a spiral lens disk must rotate at a 2700 rpm speed in order to be synchronized with the increased operating frequency of the light valve.

Figure 7A:
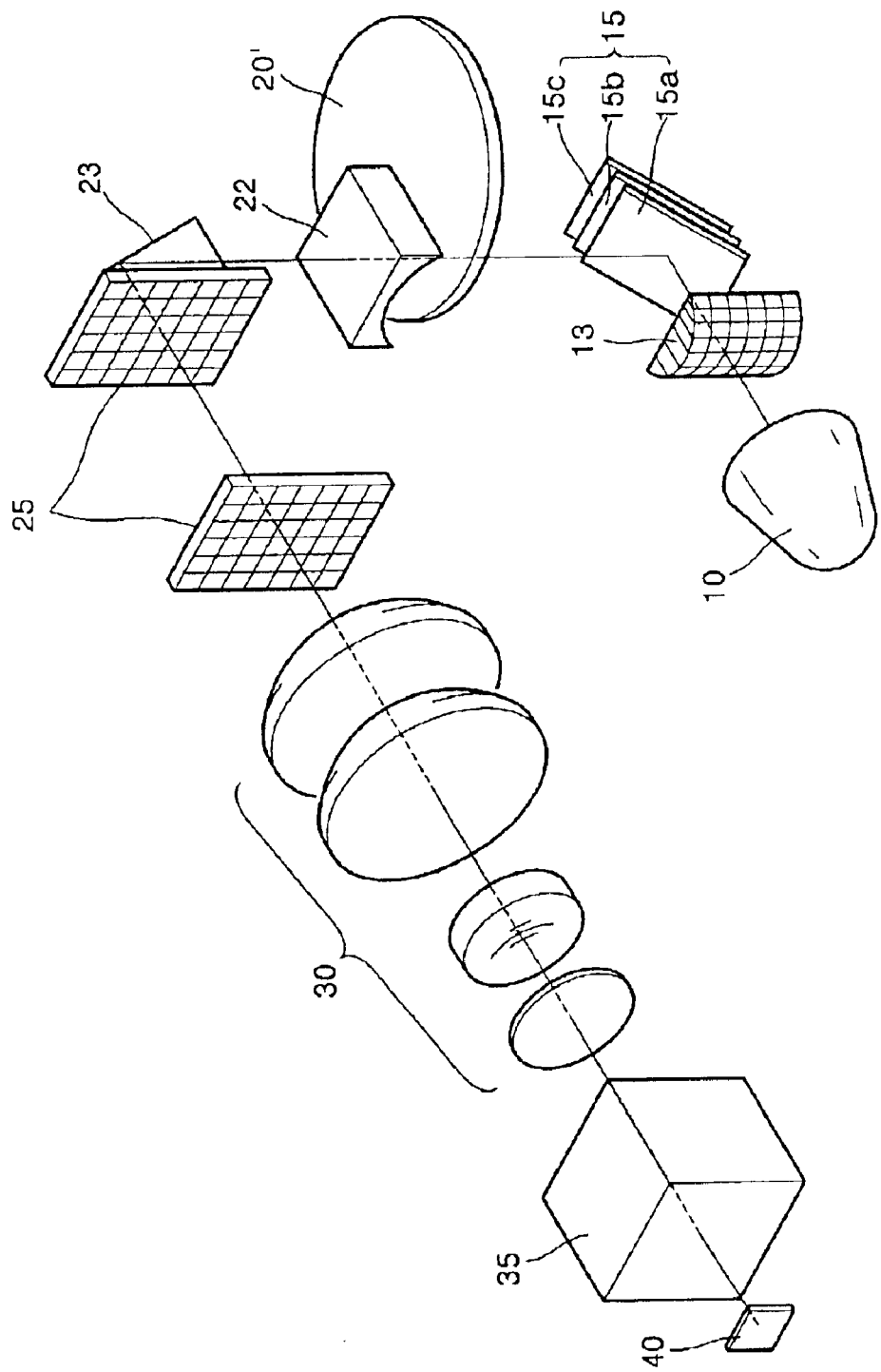
FIG. 7A is a perspective view of another example of a projection system according to the first embodiment of the present invention.
Figure 7B:
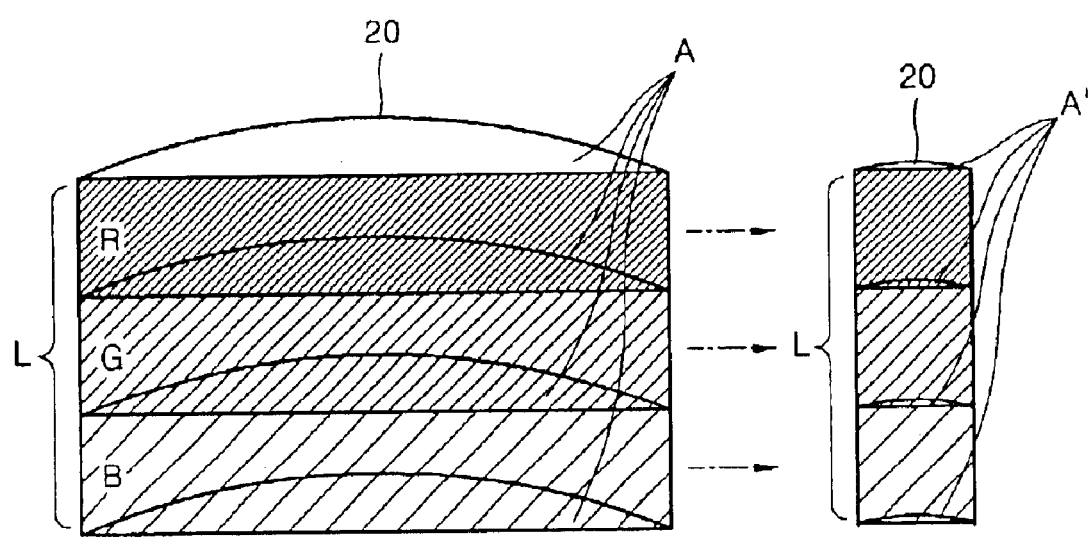
FIG. 7B shows the shapes of beams when the beams pass through the spiral lens disk of FIG. 7A.

FIG. 7A is a perspective view of the structure of a projection system according to the first embodiment of the present invention. Compared to the projection system of FIG. 3, first and second cylinder lenses 13 and 22 are further provided along a light path between the light source 10 and the fly eye lens array 25. The first and second cylinder lenses 13 and 22 can control the width of a beam emitted from the light source 10. Referring to FIG. 7B, a beam that is emitted from the light source 10 and incident upon the spiral lens disk 20 without passing through the first cylinder lens 13 is compared to a beam that has a width reduced by the first cylinder lens 13 and then is incident upon the spiral lens disk 20.

When a beam L passing through the spiral lens disk 20 is relatively wide, the shape of a spiral lens array does not match with that of the beam L, and thus light loss of an unmatched area A for each color is caused. To minimize the light loss, preferably, the first cylinder lens 13 is provided to reduce the width of the beam L so that the shape of the spiral lens array matches with that of the beam L as much as possible. Hence, if an unmatched area when the width of the beam passing through the spiral lens disk 20 is reduced is referred to as A', A' is smaller than A. Consequently, the light loss is reduced. For example, it is preferable that the width of a beam is reduced so that the size of each unmatched area is 29'.

Thereafter, light passed through the spiral lens disk 20 is turned into light that is parallel by the second cylinder lens 22. As described above, the width of light can be controlled by the first and second cylinder lenses 13 and 22. A light path conversion unit 23, such as a reflection prism, is further provided behind the second cylinder lens 22 in order to appropriately change a light path. Next, light transmitted by the spiral lens disk 20 is focused on the individual lens cells of the fly eye lens array 25. Beams of individual colors are overlapped by the lens group 30 and focused on the light valve 40. The lens group 30 can be constituted of a condenser lens and a relay lens. Color bar images formed by the spiral lens disk 20 are focused on the individual lens cells of the fly eye lens array 25.

A prism 35 is further provided between the lens group 30 and the light valve 40 in order to selectively change a light path. For example, the prism 35 can transmit a beam that advances toward the light valve 40 via the lens group 30 and reflect a beam reflected by the light valve 40 toward a projecting lens unit (not shown). An image formed by the light valve 40 is magnified by the projecting lens unit and the magnified image lands on a screen. In this way, a color image is produced.

While FIG. 3 shows a pair of spiral lens disks 20, FIG. 7A shows a single spiral lens disk 20. That is, the spiral lens disk 20 may be formed with a single disk or a plurality of disks according to a design rule.

A projection system according to a second embodiment of the present invention will now be described with reference to FIG. 8. The second embodiment is different from the first embodiment in respect of the structure of an optical separator. While the optical separator 15 in the first embodiment includes first, second, and third dichroic filters 15a, 15b, and 15c separately disposed at different angles, an optical separator 55 according to the second embodiment includes first, second, and third dichroic filters 55a, 55b, and 55c that are parallel to one another.

Figure 8:
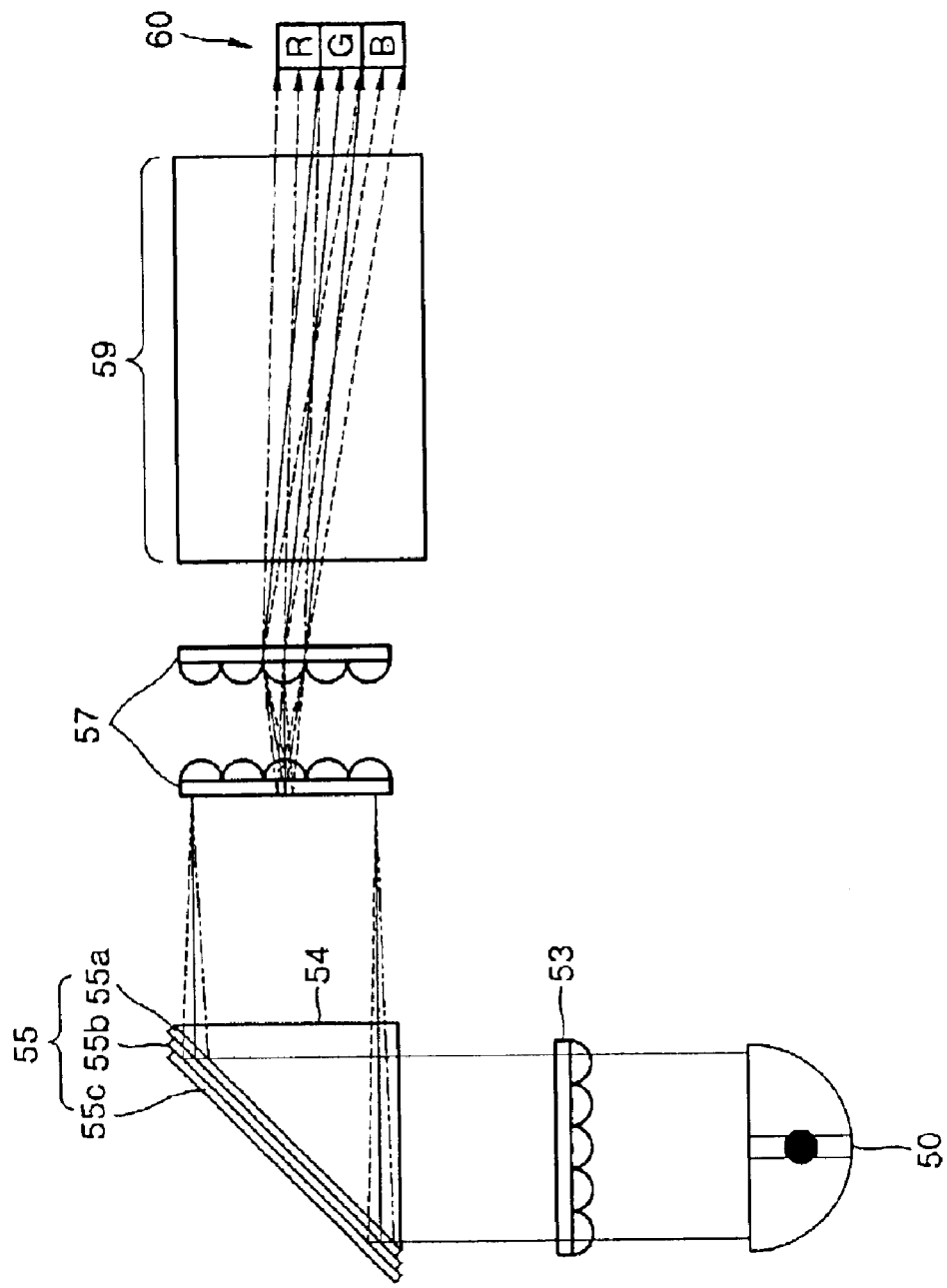
FIG. 8 is a schematic view of an example of a projection system according to a second embodiment of the present invention.

Referring to FIG. 8, light emitted from the light source 50 is transmitted by a spiral lens disk 53 and is then made incident upon the optical separator 55 via a prism 54. As described above, the optical separator 55 includes the first, second, and third dichroic filters 55a, 55b, and 55c that are parallel to one another. Light beams transmitted by the spiral lens disk 53 travel as convergent light beams of different angles according to wavelength and are then reflected at different locations on the first, second, and third dichroic filters 55a, 55b, and 55c. Thereafter, the light beams reflected by the first, second, and third dichroic filters 55a, 55b, and 55c are focused on the individual lens cells of the fly eye lens array 57. Beams of individual colors are overlapped by a lens group 59 and focused on a light valve 60.

The lens cells of the spiral lens disk 53 match with those of the fly eye lens array 57 in a one-to-one correspondence, and the lens group 59 can be constituted of a condenser lens and a relay lens. Here, the light beams transmitted in a one-to-one correspondence by the fly eye lens array 57 are overlapped and focused on the imaging surface of the light valve 60 via the lens group 59, thereby forming color bars.

The projection system having such a structure rotates the spiral lens disk 53 at a uniform speed in order to scroll the color bars formed on the light valve 60. This scrolling operation produces color images. Since the scrolling operation was already described above, it will not be described here in detail.

Figure 9:
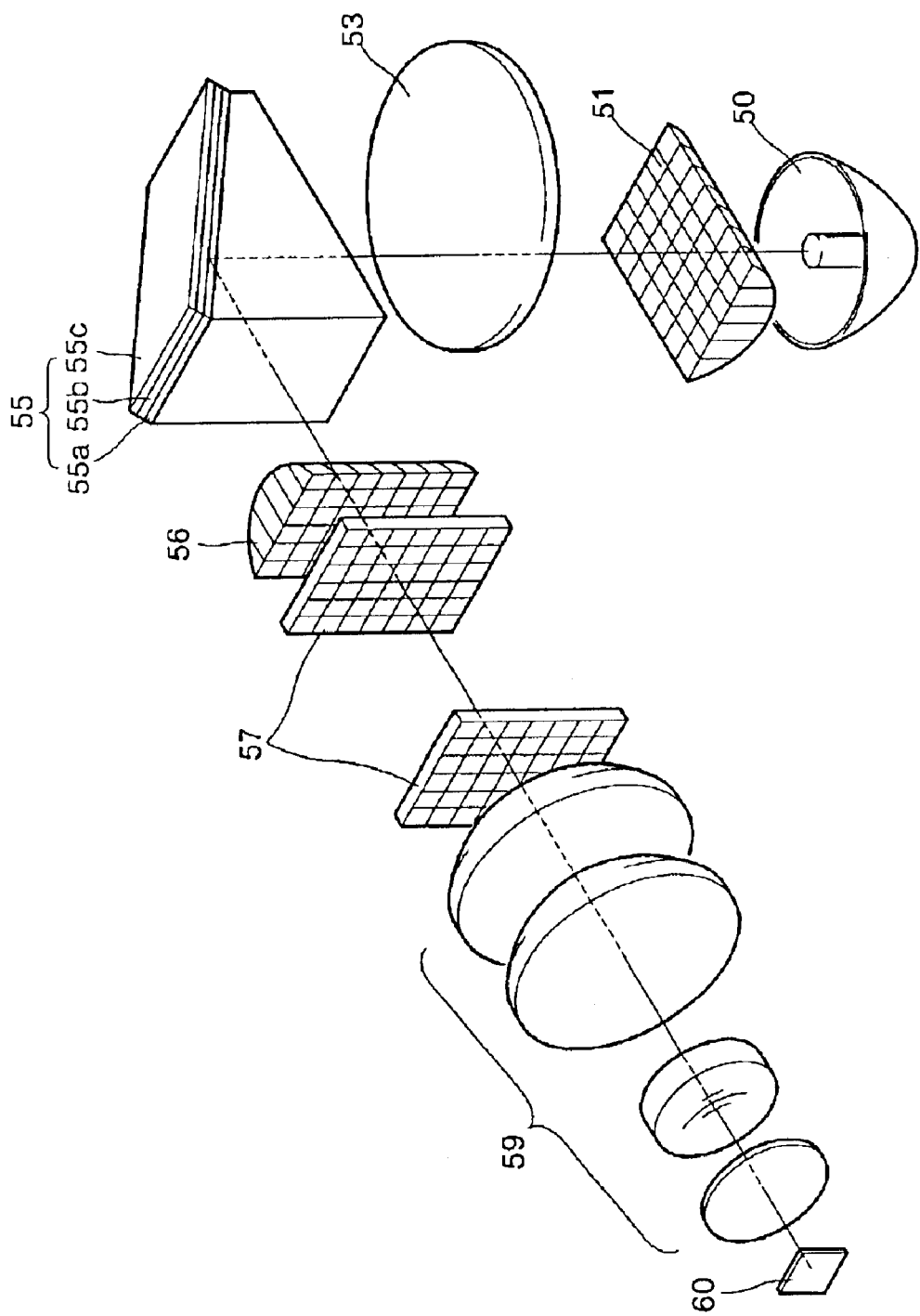
FIG. 9 is a perspective view of another example of a projection system according to the second embodiment of the present invention.

FIG. 9 is a perspective view of another example of a projection system according to the second embodiment of the present invention, in which a pair of first and second cylinder lenses 51 and 56 are further provided to reduce the width of a beam landing on the spiral lens disk 53. The same reference numerals as those in FIG. 8 denote the same elements. The first cylinder lens 51 is provided along a light path between the light source 50 and the spiral lens disk 53, and the second cylinder lens 56 is provided along a light path between the optical separator 55 and the fly eye lens array 57.

Before light emitted from the light source 50 lands on the spiral lens disk 53, the width of the beam of light is reduced by the first cylinder lens 51. By reducing the width of the beam of light landing on the spiral lens disk 53, light loss due to the inconsistency of the spiral shape of a spiral lens cell with the shape of light landing on the spiral lens cell can be reduced. That is, as the width of light decreases, the difference due to the spiral curve shape can be reduced. Then, the second cylinder lens 56 restores the light beam whose width has been reduced by the first cylinder lens 51 back into the original light beam.

Figure 10A:
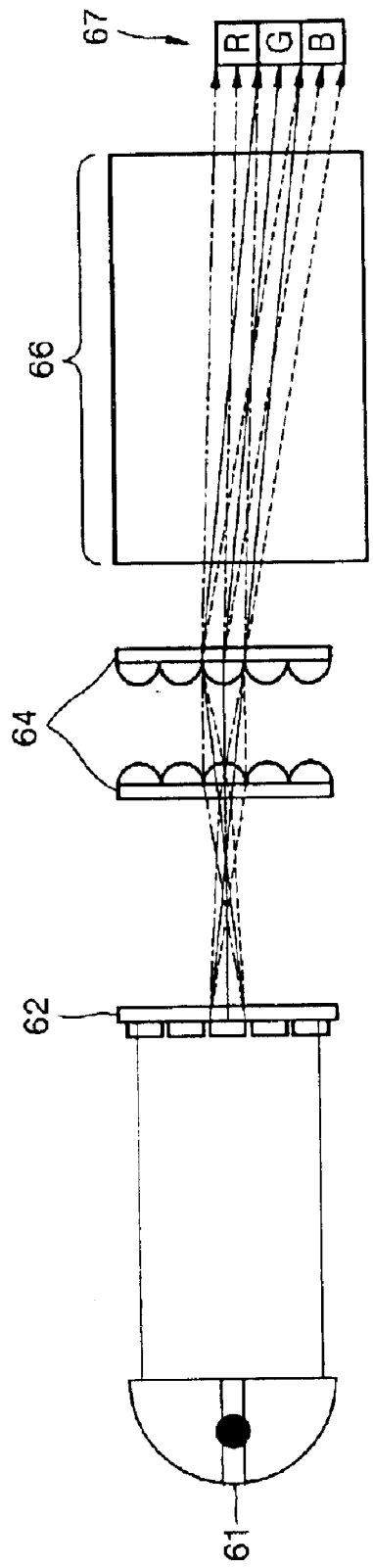
FIG. 10A is a schematic view of a projection system according to a third embodiment of the present invention.

Referring to FIG. 10A, a projection system according to a third embodiment of the present invention includes a light source 61, a diffractive optical element (DOE) spiral lens disk 62, and a light valve 67. The DOE spiral lens disk 62 is provided to separate the light emitted from the light source 61 according to wavelength and scroll the separated light beams. The light valve 67 controls an on-off operation of light transmitted by the spiral lens disk 62 on a pixel-by-pixel basis according to an input signal, thereby forming an image.

Figure 10B:
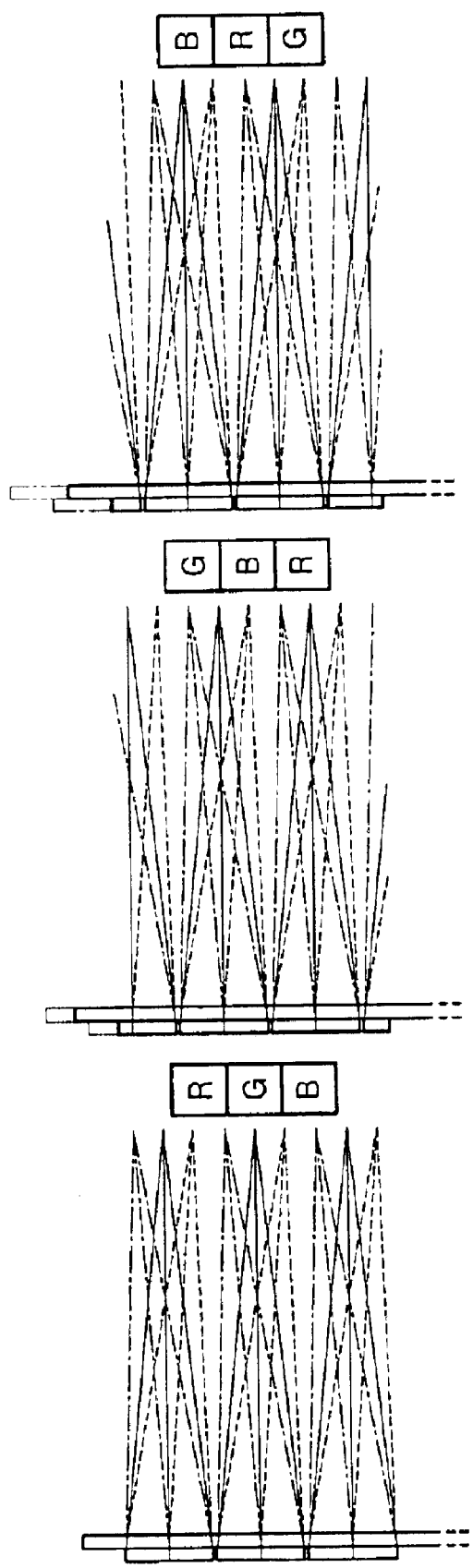
FIG. 10B illustrates a scrolling operation performed by the diffractive optical element (DOE) spiral lens disk adopted in the projection system according to the third embodiment of the present invention.

The DOE spiral lens disk 62 has spirally-disposed lens cells so as to achieve both the above-described separation of light emitted from the light source 61 and the scrolling of the light and is a diffraction optical device type. Since the DOE spiral lens disk 62 has spirally disposed lens cells, a lens array on a predetermined area is moved upward or downward at a uniform speed as the DOE spiral lens disk rotates. When the spiral lend disk rotates, the positions of the spiral lens cells through which incident light passes are moved as shown in FIG. 10B so that the positions of color bars that land on the light valve 67 are changed periodically.

While the positions of the color bars rotate, R, G, and B beams sequentially land on the light valve 67, and their on-off operations are controlled by the light valve 67 on a pixel-by-pixel basis according to an image signal. In this way, color images are formed. When light emitted from the light source 61 passes through the DOE spiral lens disk 62, the light is focused on different locations on the DOE spiral lens disk 62 according to color, so that light separation occurs. The DOE spiral lens disk can be replaced by a spiral lens disk of a holography optical element (HOE) type.

Due to the use of a spiral lens disk of a DOE or HOE type, the manufacturing cost can be reduced, and mass production is possible. In particular, since a single spiral lens disk achieves both light separation and light scrolling, a light system with a reduced number of component parts can be obtained.

A fly eye lens array 64 and a lens group 66 are provided along a light path between the DOE spiral lens disk 62 and the light valve 67. The lens cells of the DOE spiral lens disk 62 match with those of the fly eye lens array 64 in a one-to-one correspondence. Light beams transmitted by the individual lens cells of the fly eye lens array 64 are overlapped by the lens group 66 and focused on the imaging surface of the light valve 67, thereby forming color bars.

Referring to FIG. 11, a projection system according to a fourth embodiment of the present invention includes a light source 61, a DOE spiral lens disk 63 for scrolling light emitted from the light source 61, an optical separator 69 for separating the light passed through the DOE spiral lens disk 63 according to a wavelength, and a light valve 67 for forming an image by turning on/off individual pixels according to a received image signal. A prism 68 is further provided between the DOE spiral lens disk 63 and the optical separator 69, and the fly eye lens array 64 and the lens group 66 are further provided along a light path between the optical separator 69 and the light valve 67.

The DOE spiral lens disk 63 is formed of a spiral DOE. Alternatively, the DOE spiral lens disk 63 can be replaced by an HOE-type spiral lens disk.

In the operation of the projection system having such a structure, first, light beams emitted from the light source 61 passes through the DOE spiral lens disk 63 and are then made incident upon the optical separator 69 via the prism 68. As the DOE spiral lens disk 63 rotates at a uniform speed, color bars formed on the light valve 67 are scrolled so that color images are formed. For example, the optical separator 69 can be constituted of first, second, and third dichroic filters 69a, 69b, and 69c that are parallel to one another. The light beams passed through the DOE spiral lens disk 63 travel as convergent light beams and are reflected at different locations on the first, second, and third dichroic filters 69a, 69b, and 69c. Thereafter, the light beams reflected by the first, second, and third dichroic filters 69a, 69b, and 69c are transmitted through the individual lens cells of the fly eye lens array 64, overlapped through the lens group 66, and focused on the light valve 67.

Although the optical separator 69 in FIG. 11 has the first, second, and third dichroic filters 69a, 69b, and 69c that are parallel to one another, the dichroic filters can be disposed at different angles as shown in FIG. 3. If the dichroic filters 69a, 69b, and 69c are disposed at different angles, it is preferable that the DOE spiral lens disk 63 is installed behind the optical separator 69.

Preferably, the projection systems according to the third and fourth embodiments further include a pair of cylinder lenses (refer to FIGS. 7A and 9) in order to reduce the width of light that lands on the DOE spiral lens disks 62 and 63. Although the cylinder lenses are not described in detail, they can be equally applied as in the first and second embodiments.

In order to synchronize the operating frequency of the DOE spiral lens disk 62 or 63 with that of the light valve 67, either the number of lens cells on the DOE spiral lens disk 62 or 63 is changed or the rotation speed of the DOE spiral lens disk 62 or 63 is controlled. If the operating frequency of the light valve 67 increases, more lens cells are included without changing the rotation speed of the spiral lens disk 62 or 63 so that the scrolling speed of the spiral lens disk can increase. Alternatively, the DOE spiral disk 62 or 63 can be synchronized with the operating frequency of the light valve 67 by increasing the rotation speed of the spiral lens disk without changing the number of lens cells on the spiral lens disk.

The DOE spiral lens disk 62 used in the third embodiment is designed so as to achieve both light separation and light scrolling. However, in the fourth embodiment, the DOE spiral lens disk 63 is designed so as to achieve only light scrolling, while light separation is achieved by the optical separator 69.

The grating theory for a single color beam will be first described before the light separation by the DOE spiral lens disk 62 is described.

Figure 12A:
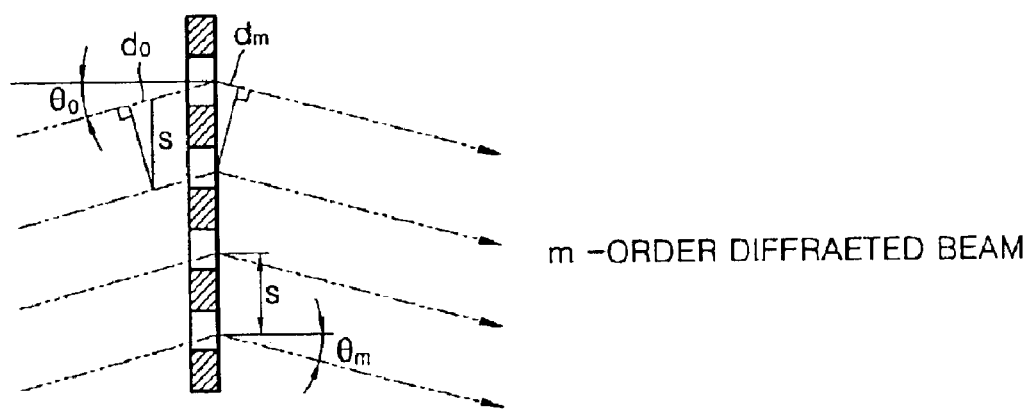
FIGS. 12A and 12B illustrate diffraction by a DOE spiral lens disk according to the present invention.

Referring to FIG. 12A, gratings are formed at predetermined intervals s, and an interference pattern due to an optical path difference (OPD) of an m-th order diffracted beam passed through the gratings is formed. If the OPD of the m-th order diffracted beam satisfies Equation 10, a bright image is observed. Equation 10 is as follows:

$$OPD = d_0 + d_m \qquad (10)$$
$$= s\sin\theta_0 + s\sin\theta_m$$
$$= m\lambda \, (m = 0, \pm 1, \pm 2, \ldots)$$

wherein $d_o$ denotes an OPD of an incident beam, $dm$ denotes an OPD of a diffraction beam, $\theta_o$ denotes an incidence angle of a beam, $\theta_m$ denotes a diffraction angle of a beam, m denotes the diffraction order of a diffracted beam, s denotes a grating interval, and $\lambda$ denotes the wavelength of the incident beam. When parallel beams are incident upon gratings, $\theta_o$ in Equation 10 is 0. Accordingly, Equation 11 is obtained as follows:

$$s \sin \theta_m = m\lambda \, (m=0,\pm 1,\pm 2, \ldots)$$

$$s = m\frac{\lambda}{\sin \theta_m} \qquad (11)$$

Figure 12B:
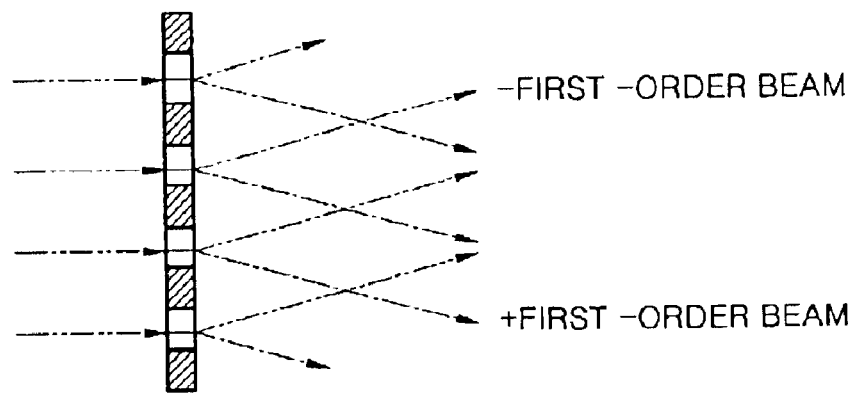

The light paths of ±first order beams among parallel incident beams are shown in FIG. 12B. If the diffraction angle $\theta_m$ in Equation 11 is significantly small, an approximate formula of $\sin \theta_m \approx \theta_m$ can be obtained. Accordingly, the grating interval s can be obtained using Equation 12:

$$s = m\frac{\lambda}{\theta_m} \qquad (12)$$

Figure 13:
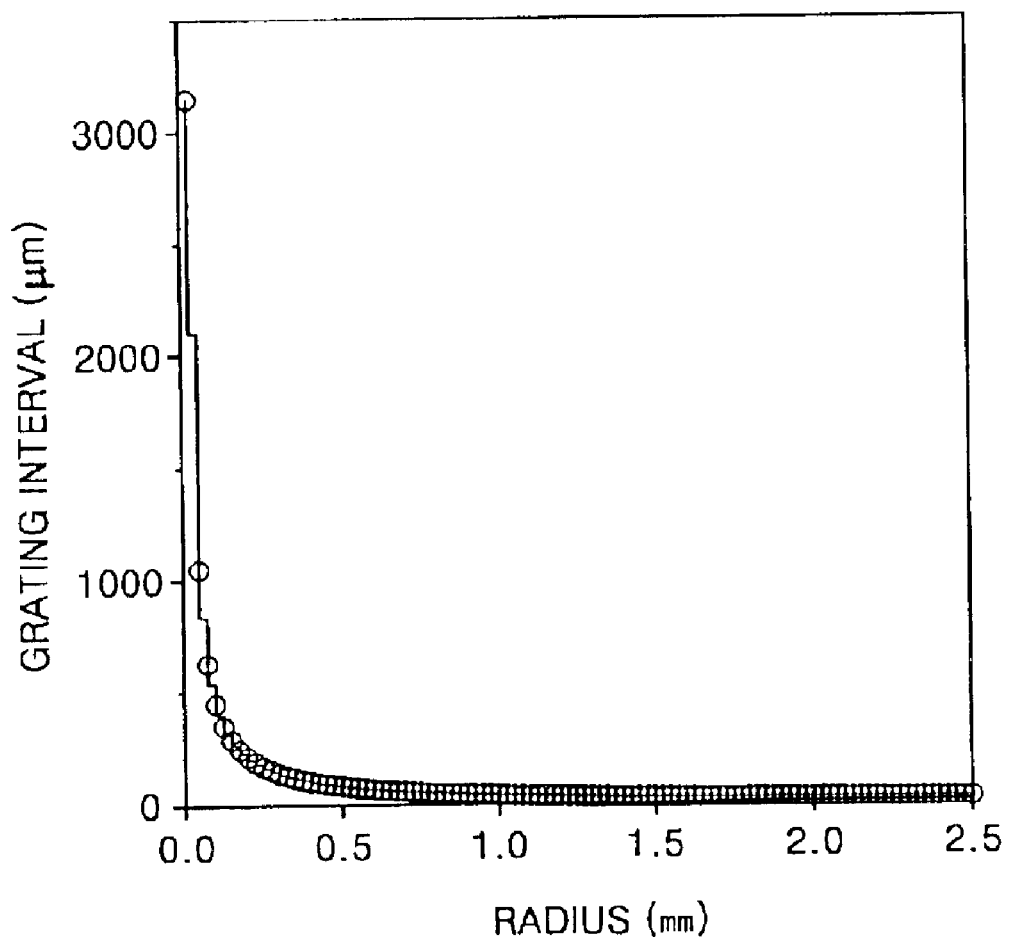
FIG. 13 is a graph showing variations in the grating interval with respect to the radius of a grating.
Figure 14:
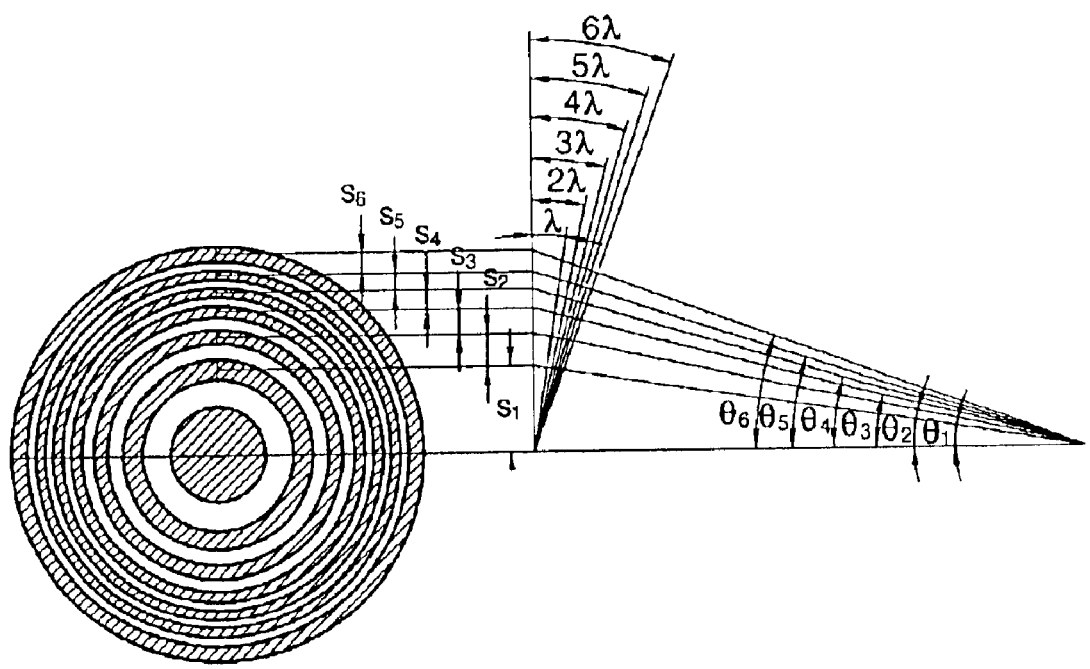
FIG. 14 illustrates beam convergence by a zone panel.

According to Equation 12, when the wavelength of an incident beam is fixed, a desired diffraction angle $\theta_m$ can be obtained by controlling the grating interval s. Meanwhile, variations in the grating interval s according to the radius of a DOE disk designed to respond to a green color are shown in FIG. 13. It can be seen from the graph of FIG. 13 that the grating interval is inversely proportional to the radius of the DOE-type disk. Based on this theory, a zone panel with circular gratings as shown in FIG. 14 can be manufactured. When going from the inner circumference of the zone panel to the outer circumference of the zone panel, the grating interval decreases like $S_1 > S_2 > S_3 > S_4 > S_5 > S_6$. With the decrease in the grating interval, the diffraction angle increases like $\theta_1 < \theta_2 < \theta_3 < \theta_4 < \theta_5 < \theta_6$. Hence, beams passed through the zone panel converge at a point.

Based on this diffraction theory, a DOE spiral lens disk according to an embodiment of the present invention is manufactured.

Figure 15A:
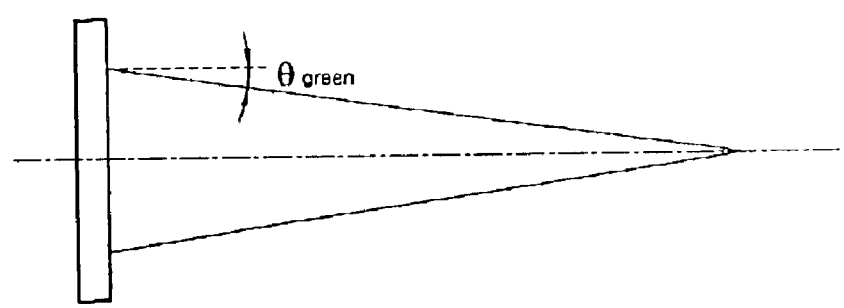
FIGS. 15A through 15C illustrate a process for manufacturing a DOE spiral lens disk according to the present invention.

Referring to FIG. 15A, as to a DOE designed to respond to a green color, when a diffraction angle of ±first order diffracted beams, $\theta_{green}$, is 2.2° and a wavelength thereof, $\lambda_{green}$, is 587 nm, the minimum grating interval $s_{geen}$ of the green-color DOE calculated using Equation $s_{green} = \lambda/\theta_{green}$ is 15 μm. For example, the grating groove depth is 1 wave (1 $\lambda_{green}$), that is, 587 nm.

Figure 15B:
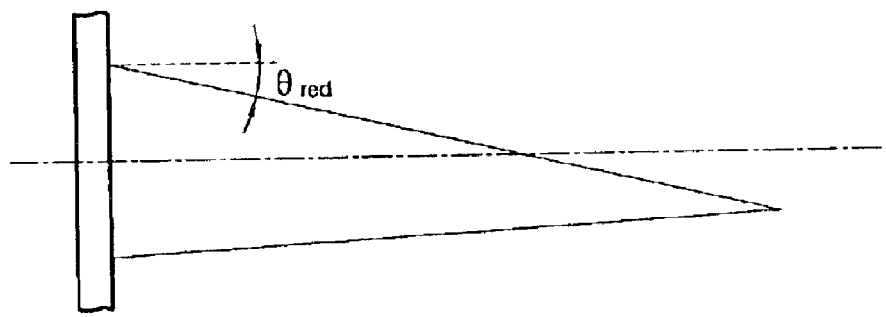

Referring to FIG. 15B, as to a DOE designed to respond to a red color, when a diffraction angle of ±first order diffracted beams, $\theta_{red}$, is 3.7° and a wavelength thereof, $\lambda_{red}$, is 670 nm, the minimum grating interval $s_{red}$ of the red-color DOE calculated using Equation $s_{red} = \lambda/\theta_{red}$ is 10.4 μm. For example, the grating groove depth is 1 $\lambda_{red}$, that is, 670 nm.

Figure 15C:
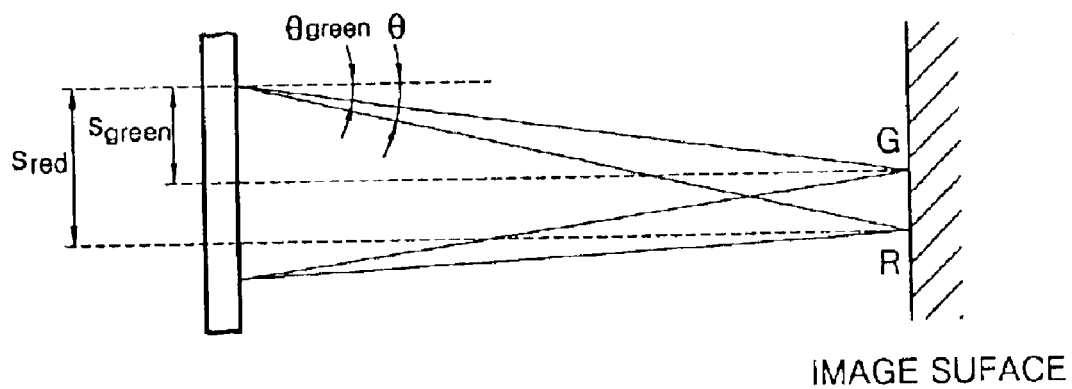

A single DOE is formed using the design conditions of the green-color and red-color DOEs shown in FIGS. 15A and 15B, respectively, so that the single DOE can separate incident light into a green color beam and a red color beam. For example, as shown in FIG. 15C, a single DOE has gratings spaced at the green-color grating interval $s_{green}$ and gratings spaced at the red-color grating interval $s_{red}$. An incident beam is separated into a red beam and a green beam by the DOE having the above-described structure, and then the green and red beams are focused on different locations over an imaging surface. Although only the green and red color grating intervals have been described, a blue-color grating interval can be calculated in the same manner. In other words, the green, red, and blue grating intervals $s_{green}$, $s_{red}$, and $s_{blue}$ can be calculated from the green, red, and blue wavelengths $\lambda_{green}$, $\lambda_{red}$, and $\lambda_{blue}$ and the diffraction angles of green, red, and blue color beams, $\theta_{green}$, $\theta_{red}$, and $\theta_{blue}$, respectively, using Equation 13:

$$s_{green} = m \frac{\lambda_{green}}{\theta_{green}} \quad (13)$$

$$s_{red} = m \frac{\lambda_{red}}{\theta_{red}}$$

$$s_{blue} = m \frac{\lambda_{blue}}{\theta_{blue}}$$

A single DOE utilizes the green, red, and blue grating intervals $s_{green}$, $s_{red}$, and $s_{blue}$ in order to separate white light into R, G, and B light beams and focus the three light beams on different locations over an imaging surface. Accordingly, light separation is achieved using the DOE, and scrolling is also achieved by a spiral lens disk formed by spiraling the DOE.

Figure 16:
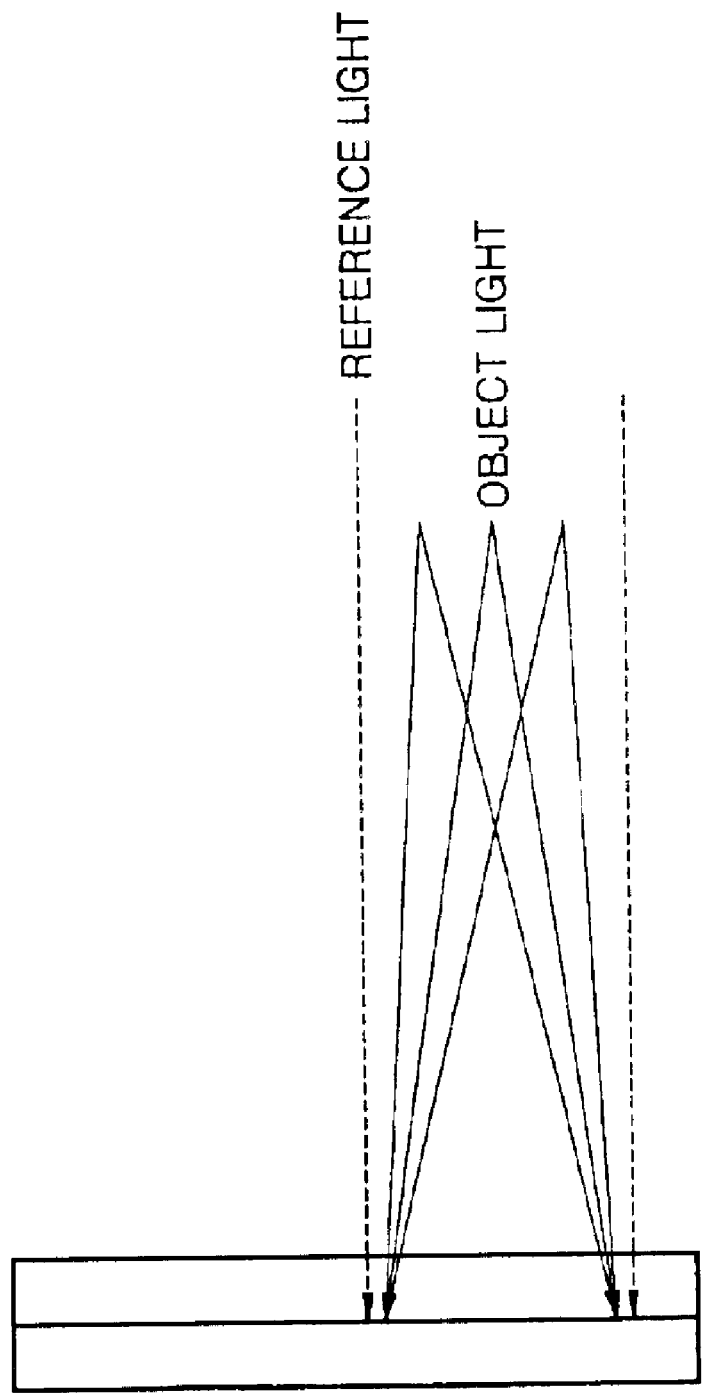
FIG. 16 illustrates the manufacture of a spiral lens disk of a volume hologram type.

A spiral lens disk according to the present invention can be manufactured using an HOE instead of a DOE. In order to manufacture an HOE-type spiral lens disk, as shown in FIG. 16, object light and reference light are projected onto a spiral dry panel so as to form an interference pattern. Here, R, G, and B beams serving as the object light are incident upon the dry panel at different angles. This hologram is called as a volume hologram, and a thin hologram can be used as a hologram for the HOE.

Figure 17A:
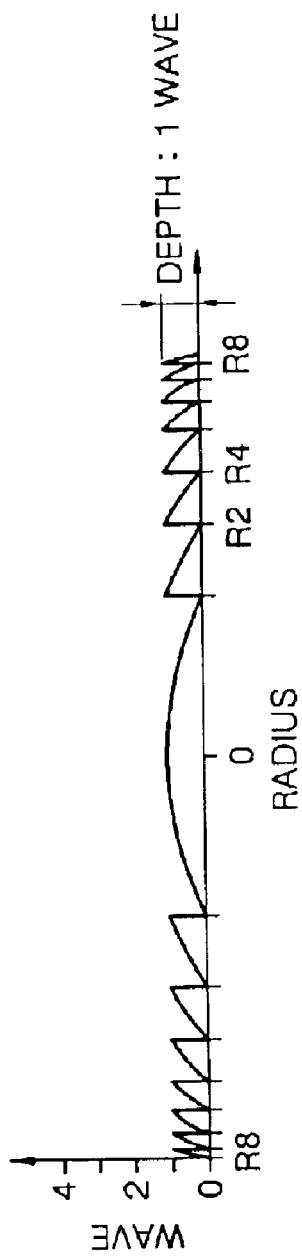
FIG. 17A is a structure view of a DOE spiral lens disk of a continuous relief type.
Figure 17B:
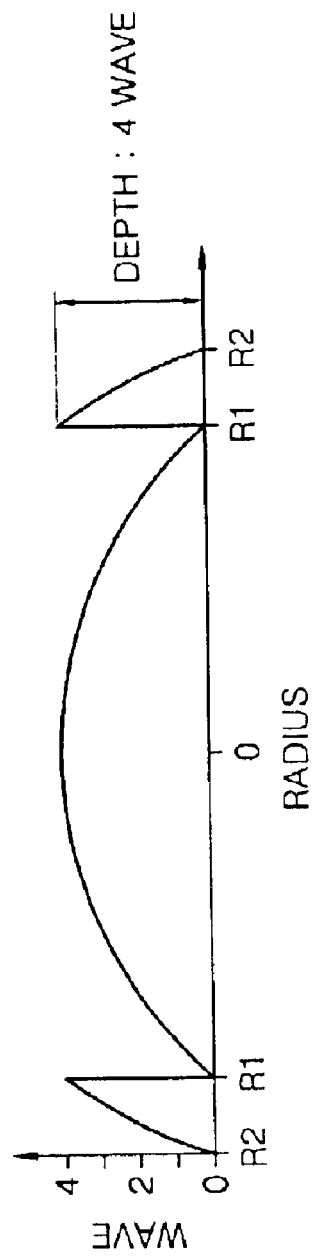
FIG. 17B is a structure view of a DOE spiral lens disk of a multiorder diffractive (MOD) lens type.

A DOE-type spiral lens disk can be manufactured in many different ways. Accordingly, examples of the DOE spiral lens disk are a continuous relief lens disk having a continuous quadrative blaze profile as shown in FIG. 17A, a diffractive fresnel lens disk having the continuous quadrative blaze profile, a multi-order diffractive (MOD) lens disk as shown in FIG. 17B, and a deep blazed surface lens disk. The MOD lens disk has fewer grooves, but they are deeper than the grooves of a continuous relief lens disk. Thus, MOD lens disks are easily manufactured and provide higher diffraction efficiency. The diffraction efficiency will be described later with reference to FIG. 18.

Figure 17C:
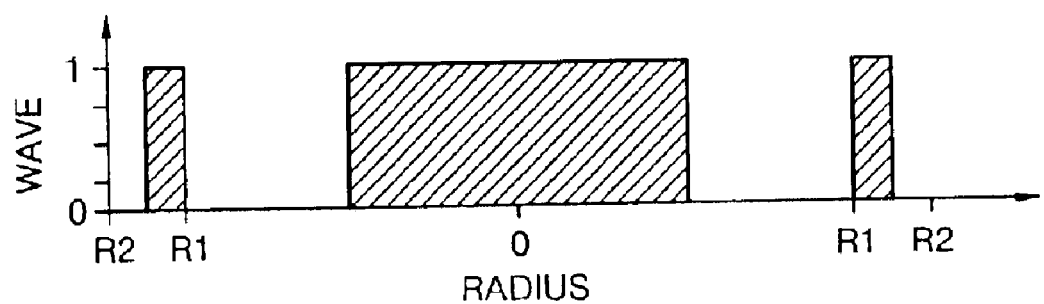
FIG. 17C is a structure view of a binary-type DOE spiral lens disk.
Figure 17D:
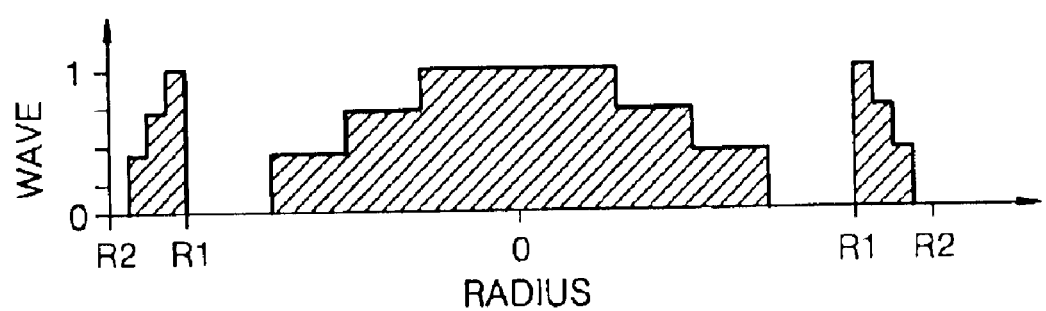
FIG. 17D is a structure view of a multi-step typed DOE spiral lens disk.

A binary DOE spiral lens disk and a multi-step DOE spiral lens disk are shown as examples of DOC spiral lens disk in FIGS. 17C and 17D, respectively. A multi-step lens disk has a step profile, but the multi-step lens disk of FIG. 17D has a three-step profile. In particular, the diffraction efficiency increases with an increase in the number of steps. In addition, a refractive fresnel lens disk (not shown) can be an example of a DOE spiral lens disk according to the present invention.

Figure 18:
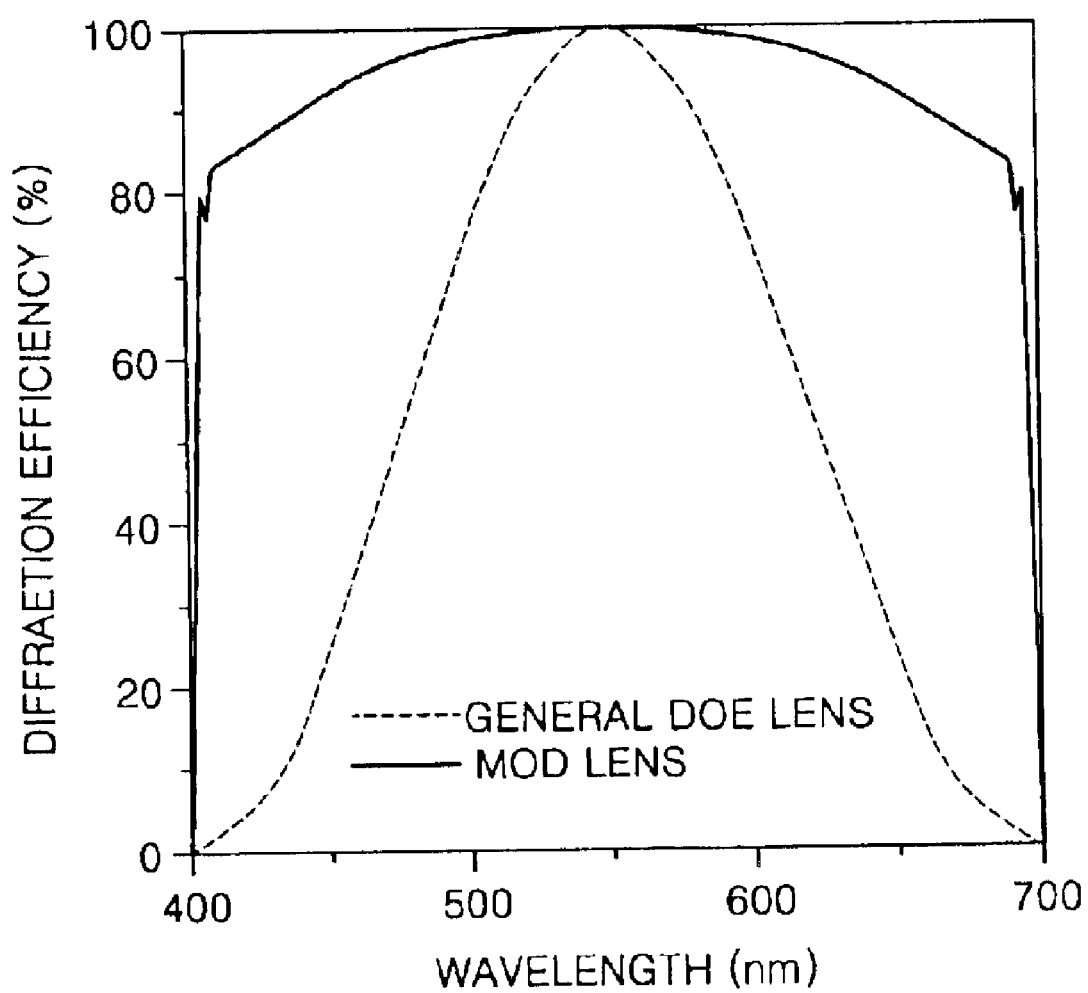
FIG. 18 is a graph showing a diffraction efficiency of a general DOE lens and a diffraction efficiency of an MOD lens with respect to a wavelength.

FIG. 18 is a graph showing a simulation result of the diffraction efficiency of a general DOE lens and the diffraction efficiency of an MOD lens. According to the simulation result shown in FIG. 18, the diffraction efficiency of the MOD lens is almost uniformly high in a wide wavelength zone in contrast to a general DOE lens. Hence, due to the use of a spiral lens disk adopting the MOD lens, highly efficient diffracted light can be used in a wide wavelength zone, and furthermore the diffraction efficiency is evenly distributed within the entire visible light band. Consequently, the quality of a color image is improved.

As described above, in the present invention, scrolling can be performed using a single spiral lens disk. Thus, the scrolling is easily controlled, the number of components is reduced, and a light, low-price projection system can be obtained.

In addition, when a spiral lens disk is manufactured using a DOE or MOD lens, it can be mass-produced at a low cost. Since both light separation and scrolling can be achieved by a single spiral lens disk, a projection system using the spiral lens disk can be simply assembled. Also, since the spiral lens disk provides improved performance because of a reduction in the manufacturing errors, a projection system employing the spiral disk provides good quality images.

Since a conventional single-panel projection system produces color images by sequentially separating white light into R, G, and B light beams, the efficiency of light to be used by a light valve is degraded to ⅓ of the light efficiency of a three-panel projection system. However, a single-panel projection system adopting a scrolling technique according to the present invention separates white light into R, G, and B beams at one time and scrolls the three color beams to form a color image. Therefore, the single-panel projection system according to the present invention can obtain the same light efficiency as the light efficiency of a three-panel projection system.

What is claimed is:

1. A spiral lens disk comprising:
   cylinder lens cells;
   wherein said cylinder lens cells are spirally arranged so that the rotation of cylinder lens cells converts into the rectilinear motion of a cylinder lens array.

2. The spiral lens disk of claim 1, wherein the cylinder lens cells are formed of any of a diffractive optical element and a hologram optical element.

3. The spiral lens disk of claim 1 or 2, wherein the cylinder lens cells are arranged so that, when a normal line is drawn to the cylinder lens cells, the interval between adjacent lens cells is uniform, and the normal vectors of adjacent lens cells are the same.

4. The spiral lens disk of claim 3, wherein a spiral track (Qkx,Qky) of a cylinder lens cell satisfies the following Equation:

$Qkx = Q1,x \cos(k-1)\theta 2 - Q1,y \sin(k-1)\theta 2$ $Qky = Q1,y \sin(k-1)\theta 2 - Q1,y \cos(k-1)\theta 2$ wherein Q1,x and Q1,y denote the x and y coordinates of a first cylinder lens cell, respectively, k denotes a natural number, and $\theta 2$ denotes a rotation angle between adjacent curves.

5. The spiral lens disk of claim 3, wherein the cross-section of the spiral lens disk is an array of arcs having the same radius.

6. The spiral lens disk of claim 2, wherein each of the cylinder lens cells is formed of any of a binary lens, a continuous relief lens, a multi-step lens, a multi-order refractive lens, a thin hologram lens, and a volume hologram lens.

7. A projection system comprising:
   a light source;
   an optical separator for separating light emitted from the light source according to wavelength;
   at least one spiral lens disk having spirally arranged cylinder lens cells so that the rotation of the cylinder lens cells converts into rectilinear motion of a cylinder lens array, scrolling incident light; and
   a light valve on which the light emitted from the light source is separated into color beams by the optical separator and the spiral lens disk and on which the color beams are focused, the light valve selectively turning on or off individual pixels according to an input image signal in order to form a color image.

8. The projection system of claim 7, further comprising a fly eye lens array between the spiral lens disk and the light valve.

9. The projection system of claim 8, wherein a lens group for making incident light be focused on the light valve is provided along a light path between the fly eye lens array and the light valve.

10. The projection system of any of claims 7 through 9, wherein the optical separator includes first through third dichroic filters adjacently disposed at different angles to selectively transmit or reflect the incident light according to wavelength.

11. The projection system of any of claims 7 through 9, wherein the optical separator includes first through third dichroic filters disposed in parallel to selectively transmit or reflect the incident light according to wavelength.

12. The projection system of claim 11, further comprising a prism before the optical separator.

13. The projection system of any of claims 7 through 9, wherein a first cylinder lens is installed before the at least one spiral lens disk, and a second cylinder lens paired with the first cylinder lens is installed behind the spiral lens disk, in order to control the width of an incident beam.

14. The projection system of any of claims 7 through 9, wherein the cylinder lens cells are formed of any of a diffractive optical element and a hologram optical element.

15. The projection system of any of claims 7 through 9, wherein the cylinder lens cells are arranged so that, when a normal line is drawn to the cylinder lens cells, the interval between adjacent lens cells is uniform, and the normal vectors of adjacent lens cells are the same.

16. The projection system of claim 15, wherein a spiral track (Qkx,Qky) of a cylinder lens cell satisfies the following Equation:

$$Qkx = Q1,x \cos(k-1)\theta 2 - Q1,y \sin(k-1)\theta 2$$

$$Qky = Q1,y \sin(k-1)\theta 2 - Q1,y \cos(k-1)\theta 2$$

wherein Q1,x and Q1,y denote the x and y coordinates of the first cylinder lens cell, respectively, k denotes a natural number, and θ2 denotes a rotation angle between adjacent curves.

17. The projection system of claim 15, wherein the cross-section of the at least one spiral lens disk is an array of arcs having the same radius.

18. The projection system of claim 14, wherein the cylinder lens cells are arranged so that, when a normal line is drawn to the cylinder lens cells, the interval between adjacent lens cells is uniform, and the normal vectors of adjacent lens cells are the same.

19. The projection system of claim 1, wherein each of the cylinder lens cells are formed of any of a binary lens, a continuous relief lens, a multi-step lens, a multi-order refractive lens, a thin hologram lens, and a volume hologram lens.

20. The projection system of any of claims 7 through 9, wherein the number of lens cells on the at least one spiral lens disk is determined so that the spiral lens disk can operate in synchronization with the operating frequency of the light valve.

21. The projection system of any of claims 7 through 9, wherein the rotation frequency of the at least one spiral lens disk is controlled so as to be synchronized with the operating frequency of the light valve.

22. A projection system comprising:
a light source;
at least one spiral lens disk having spirally arranged cylinder lens and manufactured of any of a diffractive optical element and a hologram optical element so that light emitted from the light source is separated according to wavelength and incident light is scrolled by converting the rotation of the cylinder lens cells into the rectilinear motion of a cylinder lens array; and
a light valve on which the light emitted from the light source is separated into color beams by the optical separator and the spiral lens disk and on which the color beams are focused, the light valve selectively turning on or off individual pixels according to an input image signal to form a color image.

23. The projection system of claim 22, wherein the at least one spiral lens disk is formed by arranging the cylinder lens cells so that, when a normal line is drawn to the cylinder lens cells, the interval between adjacent lens cells is uniform, and the normal vectors of adjacent lens cells are the same.

24. The projection system of claim 23, wherein a spiral track (Qkx,Qky) of a cylinder lens cell satisfies the following Equation:

$$Qkx = Q1,x \cos(k-1)\theta 2 - Q1,y \sin(k-1)\theta 2$$

$$Qky = Q1,y \sin(k-1)\theta 2 - Q1,y \cos(k-1)\theta 2$$

wherein Q1,x and Q1,y denote the x and y coordinates of a first cylinder lens cell, respectively, k denotes a natural number, and θ2 denotes a rotation angle between adjacent curves.

25. The projection system of any of claims 22 through 24, wherein the spiral lens disk is any of a binary lens disk, a continuous relief lens disk, a multi-step lens disk, a multi-order refractive lens disk, a thin hologram lens disk, and a volume hologram lens disk.

26. The projection system of any of claims 22 through 24, further comprising at least one fly eye lens array between the spiral lens disk and the light valve.

27. The projection system of claim 26, wherein a lens group for making incident light be focused on the light valve is provided along a light path between the fly eye lens array and the light valve.

28. The projection system of claim 27, wherein the lens group includes a condenser lens and a relay lens.

29. The projection system of claim 1, wherein a first cylinder lens is installed before the at least one spiral lens disk, and a second cylinder lens paired with the first cylinder lens is installed behind the at least one spiral lens disk, in order to control the width of an incident beam.

30. The projection system of claim 22, wherein the number of lens cells on the spiral lens disk is determined so that the spiral lens disk can operate in synchronization with the operating frequency of the light valve.

31. The projection system of claim 22, wherein the rotation frequency of the spiral lens disk is controlled so as to be synchronized with the operating frequency of the light valve.

* * * * *